United States Patent
Sohn

(10) Patent No.: US 11,945,651 B2
(45) Date of Patent: Apr. 2, 2024

(54) METHOD OF CONTROLLING ROBOT SYSTEM

(71) Applicant: LG ELECTRONICS INC., Seoul (KR)

(72) Inventor: Byungkuk Sohn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 225 days.

(21) Appl. No.: 16/978,637

(22) PCT Filed: Jan. 3, 2019

(86) PCT No.: PCT/KR2019/000081
§ 371 (c)(1),
(2) Date: Sep. 4, 2020

(87) PCT Pub. No.: WO2020/141636
PCT Pub. Date: Jul. 9, 2020

(65) Prior Publication Data
US 2022/0324646 A1    Oct. 13, 2022

(51) Int. Cl.
*B65G 1/04* (2006.01)
*G05B 19/4155* (2006.01)

(52) U.S. Cl.
CPC ....... *B65G 1/0492* (2013.01); *G05B 19/4155* (2013.01); *G05B 2219/50391* (2013.01)

(58) Field of Classification Search
CPC .............. B65G 1/0492; G05B 19/4155; G05B 2219/50391
See application file for complete search history.

(56) References Cited

U.S. PATENT DOCUMENTS

| | | | |
|---|---|---|---|
| 9,120,622 B1* | 9/2015 | Elazary | B25J 9/1697 |
| 9,720,414 B1* | 8/2017 | Theobald | B25J 5/007 |
| 11,049,067 B2* | 6/2021 | Pandya | G05B 19/41895 |
| 2006/0111812 A1* | 5/2006 | Okamoto | G05D 1/0274 |
| | | | 700/214 |
| 2014/0359523 A1* | 12/2014 | Jang | G06F 3/167 |
| | | | 715/781 |
| 2014/0365258 A1* | 12/2014 | Vestal | G05D 1/0297 |
| | | | 901/1 |

(Continued)

FOREIGN PATENT DOCUMENTS

| | | |
|---|---|---|
| JP | 2011-245577 A | 12/2011 |
| KR | 10-2010-0113232 A | 10/2010 |

(Continued)

*Primary Examiner* — Kyle O Logan
(74) *Attorney, Agent, or Firm* — Birch, Stewart, Kolasch & Birch, LLP

(57) ABSTRACT

Disclosed is a method of controlling a robot system, the method including a first robot receiving user input including a request for delivery of a predetermined article, the first robot transmitting information based on the user input to a server, the server identifying a supporting robot capable of supporting a task corresponding to the delivery request, the server requesting the task from a second robot identified as the supporting robot, the second robot receiving the article, and the second robot moving to a delivery destination included in the delivery request, thereby improving use convenience through cooperation between the robots.

18 Claims, 24 Drawing Sheets

(56) References Cited

U.S. PATENT DOCUMENTS

| | | | |
|---|---|---|---|
| 2015/0274421 A1* | 10/2015 | Yamada | B25J 11/0005 |
| | | | 700/218 |
| 2017/0011442 A1* | 1/2017 | Hu | G07G 1/00 |
| 2017/0252926 A1* | 9/2017 | Wise | H04L 67/1021 |
| 2018/0108102 A1* | 4/2018 | Kapuria | B65G 1/137 |
| 2018/0158016 A1* | 6/2018 | Pandya | G05B 19/41895 |
| 2018/0194556 A1* | 7/2018 | Lert, Jr. | B65G 1/1378 |
| 2019/0095854 A1* | 3/2019 | Pandya | B65G 1/0492 |
| 2020/0103921 A1* | 4/2020 | Voorhies | G05D 1/0217 |
| 2020/0202285 A1* | 6/2020 | Elazary | B65G 1/1375 |
| 2022/0009711 A1* | 1/2022 | Wan | B65G 1/1371 |

FOREIGN PATENT DOCUMENTS

| | | |
|---|---|---|
| KR | 10-2018-0031114 A | 3/2018 |
| KR | 10-2018-0037855 A | 4/2018 |
| KR | 10-2018-0081481 A | 7/2018 |
| KR | 10-2018-0127475 A | 11/2018 |

* cited by examiner

METHOD OF CONTROLLING ROBOT SYSTEM

CROSS-REFERENCE TO RELATED APPLICATION

This application is the National Phase of PCT International Application No. PCT/KR2019/000081 filed on Jan. 3, 2019, the entirety of which is hereby expressly incorporated by reference into the present application.

TECHNICAL FIELD

The present invention relates to a robot system and a method of controlling the same, and more particularly to a AI robot system capable of performing cooperative work using a plurality of robots and providing various kinds of services and a method of controlling the same.

BACKGROUND ART

Robots have been developed for industrial purposes and have taken charge of a portion of factory automation. In recent years, the number of fields in which robots are utilized has increased. As a result, a medical robot and an aerospace robot have been developed. In addition, a home robot usable at home is being manufactured. Among such robots, a robot capable of autonomously traveling is called a mobile robot.

With an increase in the use of robots, the demand for robots capable of providing various kinds of information, entertainment, and services in addition to repeated performance of simple functions has increased.

As a result, a communication robot disposed in homes, stores, and public facilities so as to communicate with people is being developed.

In addition, various kinds of services using a mobile robot that is capable of autonomously traveling have been proposed. For example, a prior document (Korean Patent Application Publication No. 10-2008-0090150, Publication Date: Oct. 8, 2008) proposes a service robot capable of providing a service based on the current position while moving in a service area, a service system using the service robot, and a method of controlling the service system using the service robot.

However, the operation and service that a single robot is capable of performing has been intensively researched and developed, even though the number and kind of proposed robots increase.

Therefore, there is a necessity for a cooperation system between robots that is capable of providing various kinds of services to customers using a plurality of robots and that is improved in terms of cost and efficiency.

DISCLOSURE

Technical Problem

It is an object of the present invention to provide a robot system capable of providing various kinds of services using a plurality of robots and a method of controlling the same.

It is another object of the present invention to provide a low-cost, high-efficiency robot system capable of minimizing intervention of an administrator and a method of controlling the same.

It is another object of the present invention to provide a robot system capable of efficiently providing the optimum service using different kinds of robots and a method of controlling the same.

It is another object of the present invention to provide a robot system capable of selecting a combination suitable for the place at which a service is provided and the kind of the service in order to provide the service using a minimum number of robots and a method of controlling the same.

It is another object of the present invention to provide a robot system capable of effectively administrating a plurality of robots and a method of controlling the same.

It is another object of the present invention to provide a robot system capable of utilizing data acquired through a plurality of robots and a method of controlling the same.

It is a further object of the present invention to provide a robot system connected to an external server in order to provide various kinds of services and a method of controlling the same.

Technical Solution

In accordance with an aspect of the present invention, the above and other objects can be accomplished by the provision of a robot system and a method of controlling the same, wherein a plurality of robots cooperates with each other in order to provide various kinds of services. In particular, different kinds of robots can be used in order to provide the optimum service satisfying the request of a customer.

In accordance with another aspect of the present invention, the above and other objects can be accomplished by the provision of a method of controlling a robot system, the method including a first robot receiving user input including a request for delivery of a predetermined article, the first robot transmitting information based on the user input to a server, the server identifying a supporting robot capable of supporting a task corresponding to the delivery request, the server requesting the task from a second robot identified as the supporting robot, the second robot receiving the article, and the second robot moving to a delivery destination included in the delivery request, thereby improving use convenience through cooperation between the robots.

Here, the first robot and the second robot can be different kinds of robots. For example, the first robot can be a robot capable of outputting predetermined information in the form of an image and speech in order to interact with a user, and the second robot can be a robot capable of delivering the article.

The server can select the supporting robot from among a plurality of robots based on at least one of whether the robots are performing tasks, the distances between the robots and the first robot, or times at which the robots are expected to finish the current tasks, whereby it is possible to select a supporting robot suitable to perform a task corresponding to the delivery request and to efficiently administrate robots.

Alternatively, in accordance with another aspect of the present invention, the above and other objects can be accomplished by the provision of a method of controlling a robot system, the method including a first robot receiving user input including a request for delivery of a predetermined article, the first robot identifying a supporting robot capable of supporting a task corresponding to the delivery request, the first robot requesting the task from a second robot identified as the supporting robot, the second robot receiving the article, and the second robot moving to a delivery destination included in the delivery request.

In this case, the first robot can select the second robot capable of performing the task from among a plurality of robots based on at least one of whether the robots are performing tasks, the distances between the robots and the first robot, or times at which the robots are expected to finish the current tasks, whereby it is possible to select a supporting robot suitable to perform a task corresponding to the delivery request and to efficiently administrate robots.

Meanwhile, in accordance with a further aspect of the present invention, the above and other objects can be accomplished by the provision of a method of controlling a robot system that is capable of providing an article delivery service to the current position or to another position.

The delivery destination can be a place at which the first robot is located or a specific place included in the user input. Also, in the case in which a place designated as the delivery destination is included in the delivery request, the second robot can move to the designated place, and in the case in which a place designated as the delivery destination is not included in the delivery request, the second robot can move to the place at which the first robot is located.

In the case in which the reception of the article is needed before the delivery of the article, the second robot can move to an article reception place in order to receive the article.

Upon arriving at the article reception place, the second robot can output a message informing of delivery request particulars such that a staff member can load or put the article on or in the second robot.

Upon confirming reception of the article, the second robot can transmit an interim report including notification of the reception of the article and movement to the delivery destination to the server or to the first robot, and the first robot can output a message corresponding to the interim report.

Upon arriving at the delivery destination, the second robot can transmit a signal informing of arrival at the delivery destination to the server or to the first robot, and the first robot can output a message informing that the second robot has arrived at the delivery destination. Upon completing the delivery task, the second robot can report completion of the task to the server or to the first robot, and the server updating data corresponding to the first robot and the second robot based on the report on the completion of the task, whereby it is possible to effectively administrate robots and to utilize data acquired from the robots.

Advantageous Effects

According to at least one of the embodiments of the present invention, it is possible to provide various kinds of services using a plurality of robots, thereby improving use convenience.

In addition, according to at least one of the embodiments of the present invention, it is possible to realize a low-cost, high-efficiency cooperation system between robots capable of minimizing intervention of an administrator.

In addition, according to at least one of the embodiments of the present invention, it is possible to efficiently provide the optimum service using different kinds of robots.

In addition, according to at least one of the embodiments of the present invention, it is possible to select a combination suitable for the place at which a service is provided and the kind of the service in order to provide the service using a minimum number of robots.

In addition, according to at least one of the embodiments of the present invention, it is possible to effectively administrate a plurality of robots and to utilize data acquired through the robots.

In addition, according to at least one of the embodiments of the present invention, it is possible to realize a robot system connected to an external server in order to provide various kinds of services.

Various other effects of the present invention will be directly or suggestively disclosed in the following detailed description of the invention.

BEST MODE

Reference will now be made in detail to embodiments, examples of which are illustrated in the accompanying drawings. However, the present invention can be embodied in many different forms and should not be construed as being limited to the embodiments set forth herein.

Meanwhile, in the following description, with respect to constituent elements used in the following description, the suffixes "module," "assembly" and "unit" are used or combined with each other only in consideration of ease in the preparation of the specification, and do not have or indicate mutually different meanings. Accordingly, the suffixes "module," "assembly" and "unit" can be used interchangeably.

It will be understood that although the terms "first," "second," etc., can be used herein to describe various components, these components should not be limited by these terms. These terms are only used to distinguish one component from another component.

Figure 1:
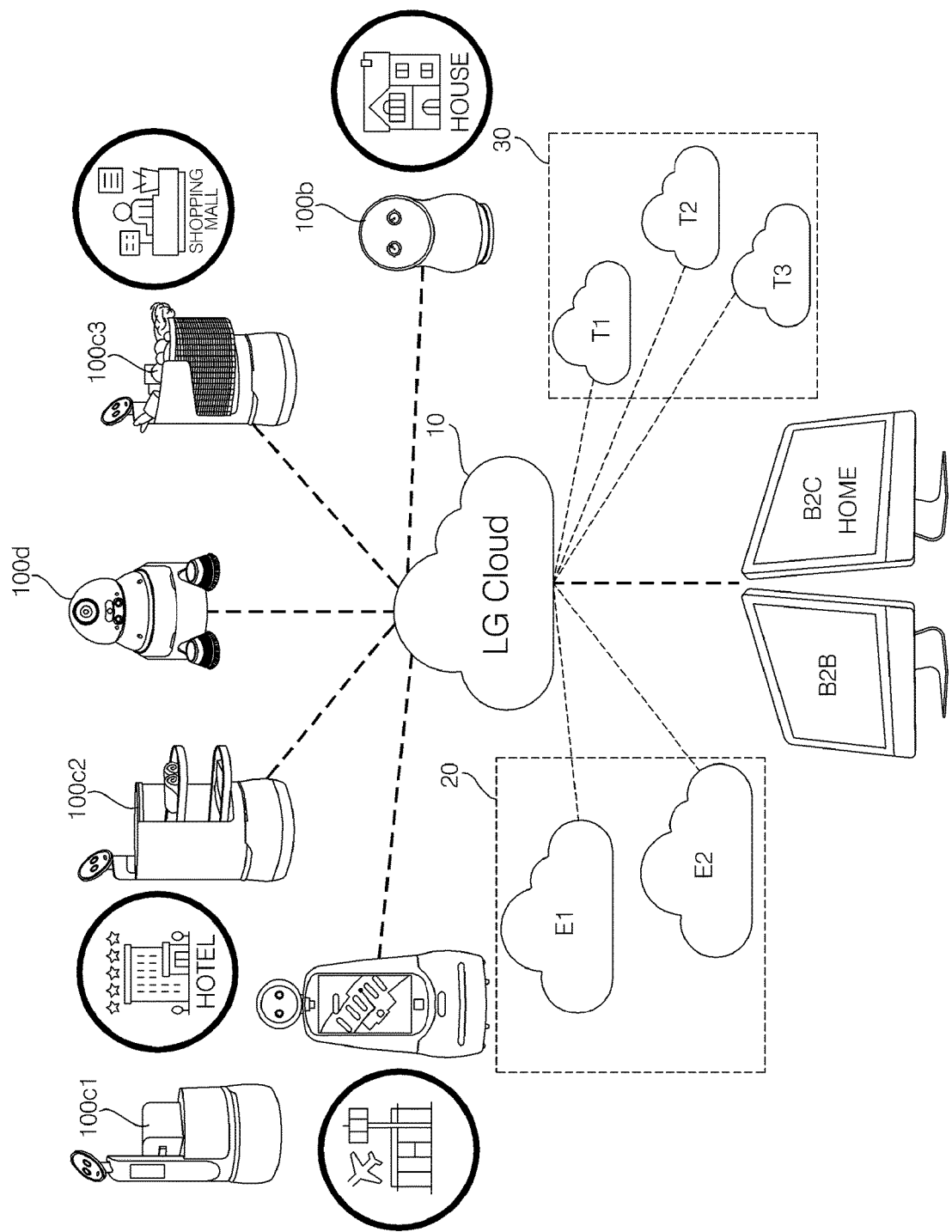
FIG. 1 is a view showing the construction of a robot system according to an embodiment of the present invention.

FIG. 1 is a view showing the construction of a robot system according to an embodiment of the present invention.

Referring to FIG. 1, the robot system 1 according to an embodiment of the present invention can include one or more robots 100a, 100b, 100c1, 100c2, and 100c3 in order to provide services at various places, such as an airport, a hotel, a mart, a clothing store, a logistics center, and a hospital. For example, the robot system 1 can include at least one of a guide robot 100a for providing information about a specific place, article, and service, a home robot 100b for interacting with a user at home and communicating with another robot or electronic device based on user input, delivery robots 100c1, 100c2, and 100c3 for delivering specific articles, or a cleaning robot 100d for performing cleaning while autonomously traveling.

Preferably, the robot system 1 according to an embodiment of the present invention includes a plurality of robots 100a, 100b, 100c1, 100c2, 100c3, and 100d and a server 10 for administrating and controlling the robots 100a, 100b, 100c1, 100c2, 100c3, and 100d.

The server 10 can remotely monitor and control the state of the robots 100a, 100b, 100c1, 100c2, 100c3, and 100d, and the robot system 1 can provide more effective services using the robots 100a, 100b, 100c1, 100c2, 100c3, and 100d.

More preferably, the robot system 1 includes various kinds of robots 100a, 100b, 100c1, 100c2, 100c3, and 100d. Consequently, it is possible to provide various kinds of services through the respective robots and to provide more various and convenient services through cooperation between the robots.

The robots 100a, 100b, 100c1, 100c2, 100c3, and 100d and the server 10 can include a communication means that supports one or more communication protocols in order to communicate with each other. In addition, the robots 100a, 100b, 100c1, 100c2, 100c3, and 100d and the server 10 can communicate with a PC, a mobile terminal, or another external server.

For example, the robots 100a, 100b, 100c1, 100c2, 100c3, and 100d and the server 10 can communicate with each other using a message queuing telemetry transport (MQTT) scheme.

Alternatively, the robots 100a, 100b, 100c1, 100c2, 100c3, and 100d and the server 10 can communicate with each other using a hypertext transfer protocol (HTTP) scheme.

In addition, the robots 100a, 100b, 100c1, 100c2, 100c3, and 100d and the server 10 can communicate with a PC, a mobile terminal, or another external server using the HTTP or MQTT scheme.

Depending on circumstances, the robots 100a, 100b, 100c1, 100c2, 100c3, and 100d and the server 10 can support two or more communication protocols, and can use the optimum communication protocol depending on the kind of communication data or the kind of a device participating in communication.

The server 10 can be realized as a cloud server, whereby a user can use data stored in the server 10 and a function or service provided by the server 10 using any of various devices, such as a PC or a mobile terminal, which is connected to the server. The cloud server 10 can be operatively connected to the robots 100a, 100b, 100c1, 100c2, 100c3, and 100d in order to monitor and control the robots 100a, 100b, 100c1, 100c2, 100c3, and 100d and to remotely provide various solutions and content.

The user can retrieve or control information about the robots 100a, 100b, 100c1, 100c2, 100c3, and 100d in the robot system using the PC or the mobile terminal.

In this specification, the "user" is a person who uses a service through at least one robot, and can include an individual customer who purchases or borrows a robot in order to use the robot at home, a manager or a staff member of a company who provides services to the staff or customers using a robot, and customers who use services provided by the company. Consequently, the "user" can include an individual customer (business to consumer; B2C) and a business customer (business to business; B2B).

The user can monitor the state and location of the robots 100a, 100b, 100c1, 100c2, 100c3, and 100d in the robot system and can administrate content and task schedules using the PC or the mobile terminal.

Meanwhile, the server 10 can store and administrate information received from the robots 100a, 100b, 100c1, 100c2, 100c3, and 100d and other devices.

The server 10 can be a server that is provided by a manufacturing company of the robots 100a, 100b, 100c1, 100c2, 100c3, and 100d in the robot system and can administrate content and task schedules or a company to which the manufacturing company entrusts services.

Meanwhile, the system according to the present invention can be operatively connected to two or more servers.

For example, the server 10 can communicate with external cloud servers 20, such as E1 and E2, and with third parties 30 providing content and services, such as T1, T2, and T3. Consequently, the server 10 can be operatively connected to the external cloud servers 20 and with third parties 30 in order to provide various kinds of services.

The server 10 can be a control server for administrating and controlling the robots 100a, 100b, 100c1, 100c2, 100c3, and 100d.

The server 10 can simultaneously or individually control the robots 100a, 100b, 100c1, 100c2, 100c3, and 100d. In addition, the server 10 can group at least some of the robots 100a, 100b, 100c1, 100c2, 100c3, and 100d in order to perform group-based control.

Meanwhile, the server 10 can be configured as a plurality of servers, to which information and functions are distributed, or as a single integrated server.

Since the server 10 is configured as a plurality of servers, to which information and functions are distributed or as a single integrated server in order to administrate all services using the robots, the server can be called a robot service delivery platform (RSDP).

FIGS. 2a to 2d are reference views illustrating a robot service delivery platform included in the robot system according to the embodiment of the present invention.

Figure 2A:
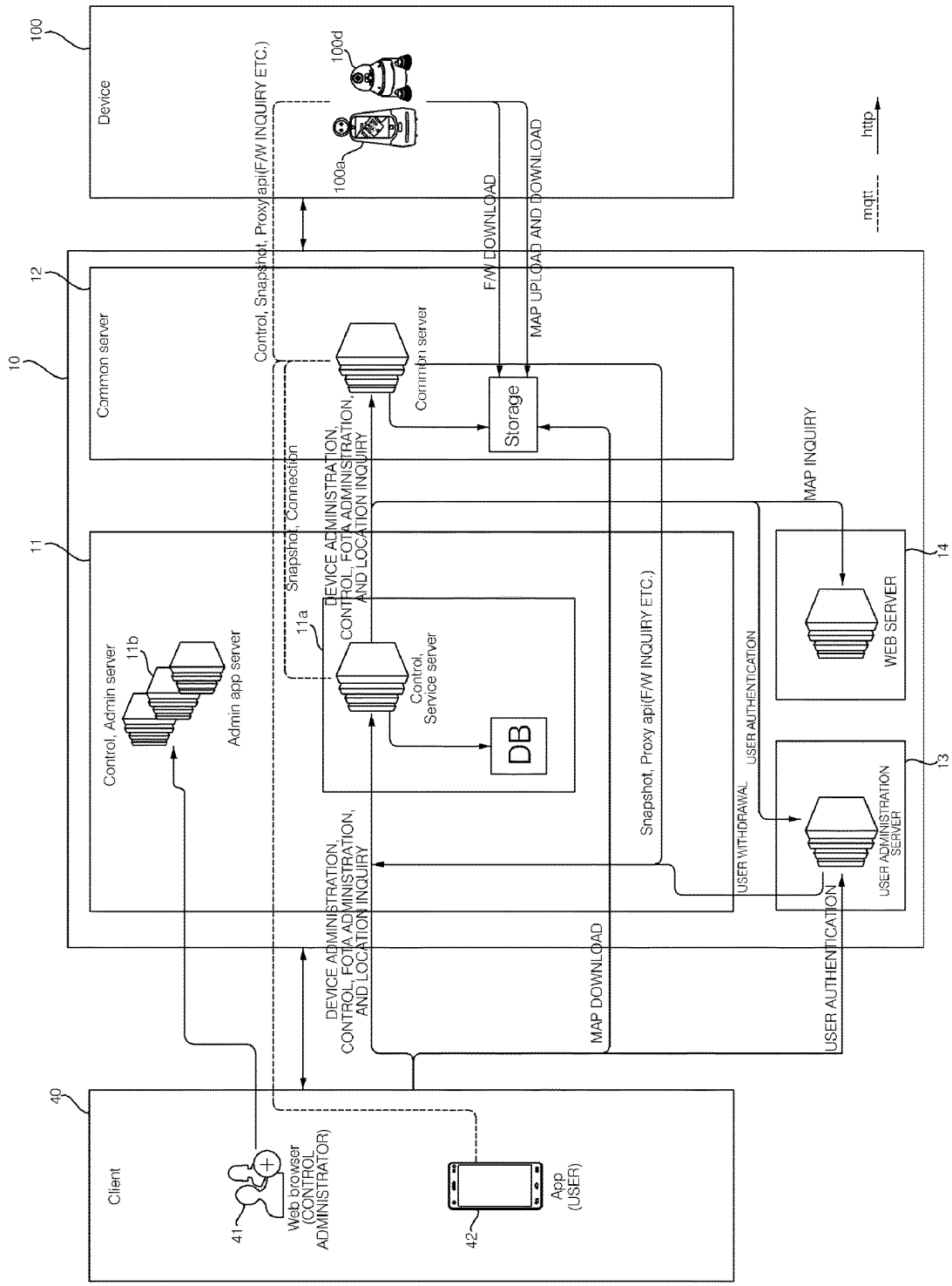
FIGS. 2a to 2d are reference views illustrating a robot service delivery platform included in the robot system according to the embodiment of the present invention.

FIG. 2a shows communication architecture of a robot service delivery platform according to an embodiment of the present invention.

Referring to FIG. 2a, the robot service delivery platform 10 can include one or more servers 11 and 12 in order to administrate and control robots 100, such as the guide robot 100a or the cleaning robot 100d.

The robot service delivery platform 10 can include a control server 11 for communicating with a client 40 through a web browser 41 or an application 42 in a mobile terminal and administrating and controlling the robots 100 and a device administration server 12 for relaying and administrating data related to the robot 100.

The control server 11 can include a control/service server 11a for providing a control service capable of monitoring the state and location of the robots 100 and administrating content and task schedules based on user input received from the client 40 and an administrator application server 11b that a control administrator is capable of accessing through the web browser 41.

The control/service server 11a can include a database, and can respond to a service request from the client 40, such as robot administration, control, firmware over the air (FOTA) upgrade, and location inquiry.

The administrator application server 11b can be accessed under the authority of the administrator, and the administrator application server can administrate functions related to the robot, applications, and content.

The device administration server 12 can function as a proxy server, and store metadata related to original data, and can perform a data backup function utilizing a snapshot indicating the state of a storage device.

The device administration server 12 can include a storage for storing various kinds of data and a common server for communicating with the control/service server 11a. The common server can store various kinds of data in the storage, can retrieve data from the storage, and can respond to a service request from the control/service server 11a, such as robot administration, control, firmware over the air, and location inquiry.

In addition, the robots 100 can download map data and firmware data stored in the storage.

Since the control server 11 and the device administration server 12 are separately configured, it is not necessary to retransmit data after storing the data in the storage, where there is an advantage in terms of the processing speed and time and effective administration is easily achieved in terms of security.

Meanwhile, the robot service delivery platform 10 is a set of servers that provide services related to the robot, and can mean all components excluding the client 40 and the robots 100 in FIG. 2a.

For example, the robot service delivery platform 10 can further include a user administration server 13 for administrating user accounts. The user administration server 13 can administrate user authentication, registration, and withdrawal.

In some embodiments, the robot service delivery platform 10 can further include a map server 14 for providing map data and data based on geographical information.

The map data received by the map server 14 can be stored in the control server 11 and/or the device administration server 12, and the map data in the map server 14 can be downloaded by the robots 100. Alternatively, the map data can be transmitted from the map server 14 to the robots 100 according to a request from the control server 11 and/or the device administration server 12.

The robots 100 and the servers 11 and 12 can include a communication means that support one or more communication protocols in order to communicate with each other.

Referring to FIG. 2a, the robots 100 and the servers 11 and 12 can communicate with each other using the MQTT scheme. The MQTT scheme is a scheme in which a message is transmitted and received through a broker, and is advantageous in terms of low power and speed. Meanwhile, in the case in which the robot service delivery platform 10 uses the MQTT scheme, the broker can be constructed in the device administration server 12.

In addition, the robots 100 and the servers 11 and 12 can support two or more communication protocols, and can use the optimum communication protocol depending on the kind of communication data or the kind of a device participating in communication. FIG. 2a shows a communication path using the MQTT scheme and a communication path using the HTML scheme.

Meanwhile, the servers 11 and 12 and the robots 100 can communicate with each other using the MQTT scheme irrespective of the kind of the robots.

The robots 100 can transmit the current state thereof to the servers 11 and 12 through an MQTT session, and can receive remote control commands from the servers 11 and 12. For MQTT connection, a digital certificate of authentication, such as a personal key (issued for SCR generation), an X.509 certificate of authentication received at the time of robot registration, or a certificate of device administration server authentication, or can other authentication schemes can be used.

In FIG. 2a, the servers 11, 12, 13, and 14 are classified based on the functions thereof. However, the present invention is not limited thereto. Two or more functions can be performed by a single server, and a single function can be performed by two or more servers.

Figure 2B:
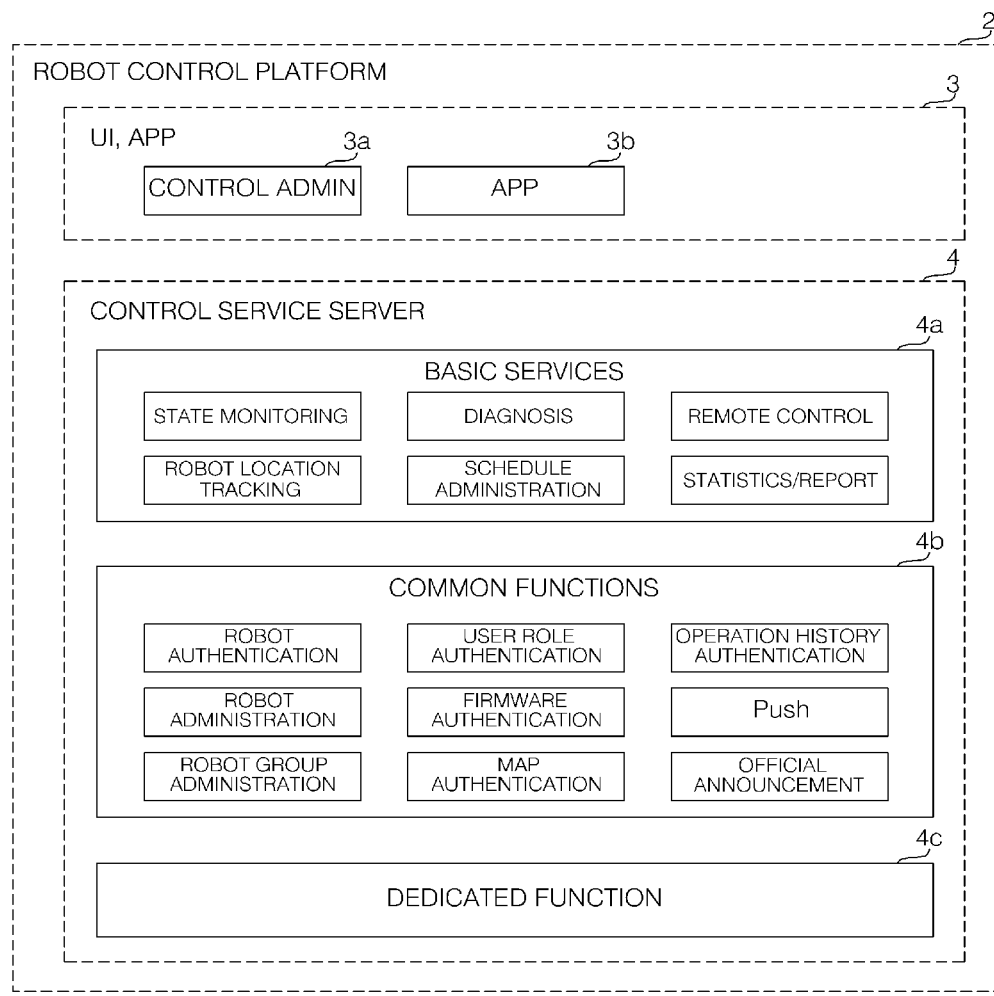

FIG. 2b shows a block diagram of the robot service delivery platform according to the embodiment of the present invention, and shows upper-level applications of a robot control platform related to robot control.

Referring to FIG. 2b, the robot control platform 2 can include a user interface 3 and functions/services 4 provided by the control/service server 11a.

The robot control platform 2 can provide a web site-based control administrator user interface 3a and an application-based user interface 3b.

The client 40 can use the user interface 3b, provided by the robot control platform 2, through their own device.

Figure 2C:
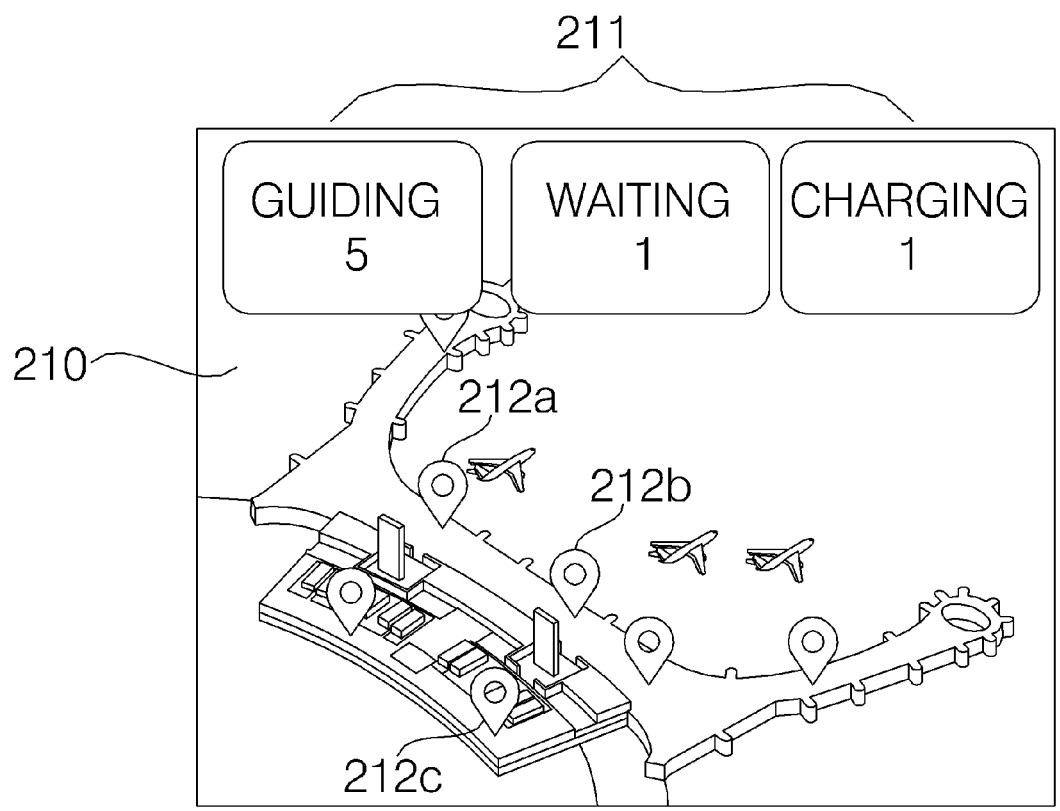
Figure 2D:
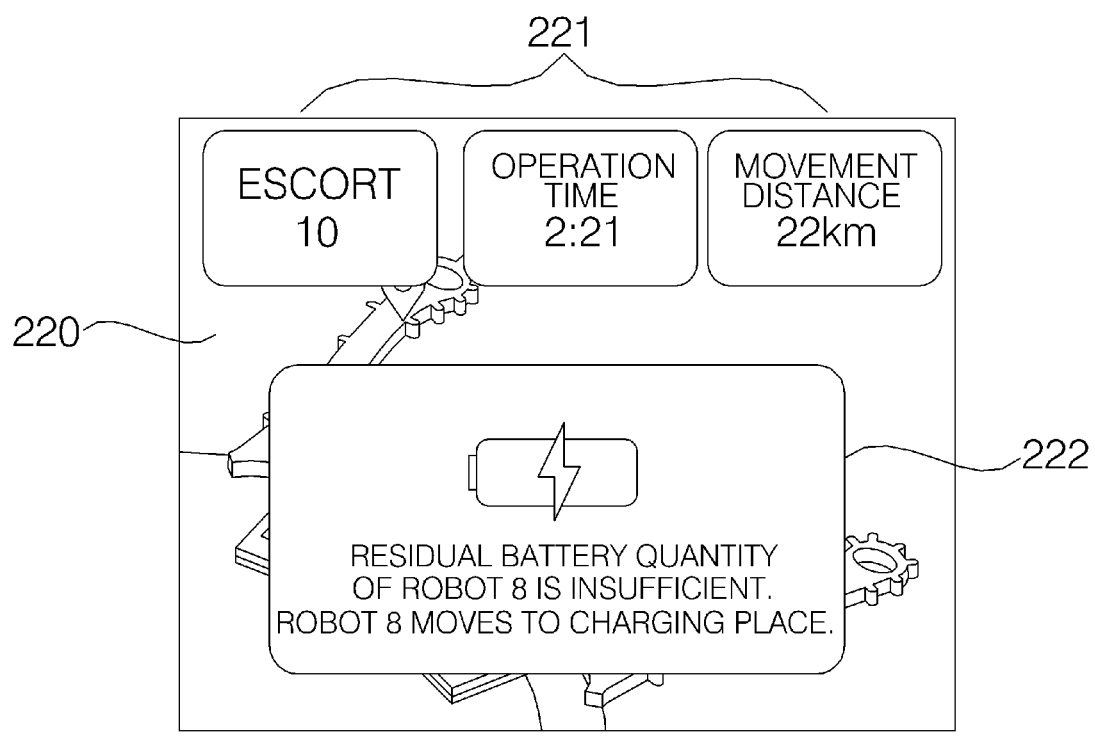

FIGS. 2c and 2d show a user interface provided by the robot service delivery platform 10 according to the embodiment of the present invention.

FIG. 2c shows a monitoring screen 210 related to a plurality of guide robots 100a.

Referring to FIG. 2c, the user interface screen 210 provided by the robot service delivery platform 10 can include state information 211 of the robots and location information 212a, 212b, and 212c of the robots.

The state information 211 can indicate the current state of the robots, such as guiding, waiting, or charging.

The location information 212a, 212b, and 212c can indicate the current location of the robots on a map screen. In some embodiments, the location information 212a, 212b, and 212c can be displayed using different shapes and colors depending on the state of the robots in order to intuitively provide much more information.

The user can monitor the operation mode of the robots and the current location of the robots in real time through the user interface screen 210.

FIG. 2d shows monitoring screens relates to an individual guide robot 100a.

Referring to FIG. 2d, when the individual guide robot 100a is selected, user interface screen 220 including history information 221 for a predetermined period of time can be provided.

The user interface screen 220 can include information about the current location of the selected individual guide robot 100a.

In addition, the user interface screen 220 can include notification information 222 about the individual guide robot 100a, such as the residual battery quantity and movement thereof.

Meanwhile, referring to FIG. 2b, the control/service server 11a can include common units 4a and 4b including functions and services that are commonly applied to the robots and a dedicated unit 4c including specialized functions related to at least some of the robots.

In some embodiments, the common units 4a and 4b can be divided into basic services 4a and common functions 4b.

The common units 4a and 4b can include a state monitoring service capable of checking the state of the robots, a diagnostic service capable of diagnosing the state of the robots, a remote control service capable of remotely controlling the robots, a robot location tracking service capable of tracking the location of the robots, a schedule administration service capable of assigning, checking, and modifying tasks of the robots, and a statistics/report service capable of checking various kinds of statistical data and analysis reports.

In addition, the common units 4a and 4b can include a user roll administration function of administrating the authority of a robot authentication function user, an operation history administration function, a robot administration function, a firmware administration function, a push function related to a push notification, a robot group administration function capable of setting and administrating groups of robots, a map administration function capable of checking and administrating map data and version information, and an official announcement administration function.

The dedicated unit 4c can include specialized functions considering the places at which the robots are operated, the kind of services, and the requests of customers. The dedicated unit 4c can mainly include specialized functions for B2B customers. For example, in the case of the cleaning robot 100d, the dedicated unit 4c can include a cleaning area setting function, a site-based state monitoring function, a cleaning schedule setting function, and a cleaning history inquiry function.

Meanwhile, the specialized functions provided by the dedicated unit 4c can be based on functions and services that are commonly applied. For example, the specialized functions can be configured by modifying the basic services 4a or adding predetermined services to the basic services 4a. Alternatively, the specialized functions can be configured by modifying some of the common functions 4b.

In this case, the basic services or the common functions corresponding to the specialized functions provided by the dedicated unit 4c can be removed or inactivated.

Figure 3:
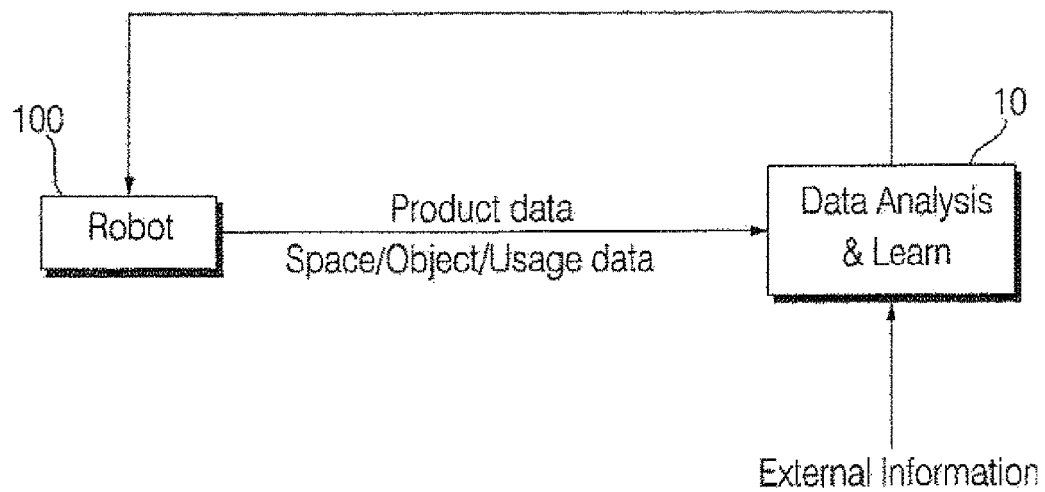
FIG. 3 is a reference view illustrating learning using data acquired by a robot according to an embodiment of the present invention.

FIG. 3 is a reference view illustrating learning using data acquired by a robot according to an embodiment of the present invention.

Referring to FIG. 3, product data acquired by the operation of a predetermined device, such as a robot 100, can be transmitted to the server 10.

For example, the robot 100 can transmit space-, object-, and usage-related data to the server 10.

Figure 7:
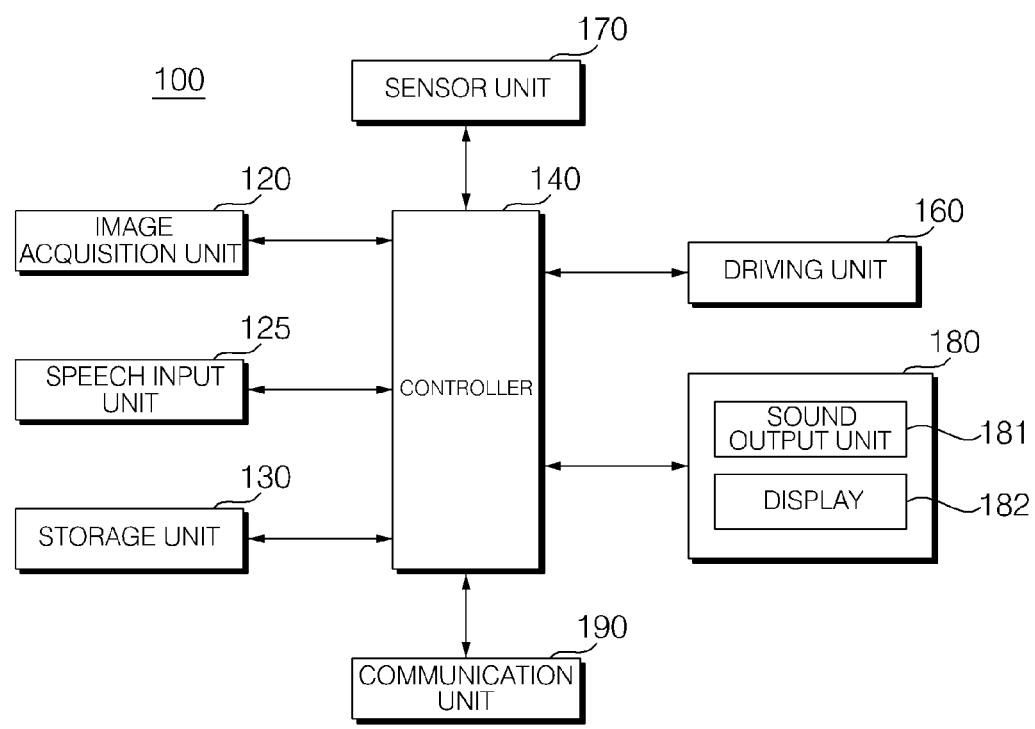
FIG. 7 shows an example of a simple internal block diagram of a robot according to an embodiment of the present invention.

Here, the space- and object-related data can be recognition-related data of the space and object recognized by the robot 100 or image data about the space and object acquired by an image acquisition unit 120 (see FIG. 7).

In some embodiments, the robot 100 and the server 10 can include a software- or hardware-type artificial neural network (ANN) trained to recognize at least one of the attributes of users, the attributes of speeches, the attributes of spaces, or the attributes of objects, such as obstacles.

In an embodiment of the present invention, the robot 100 and the server 10 can include a deep neural network (DNN) trained using deep learning, such as a convolutional neural network (CNN), a recurrent neural network (RNN), or a deep belief network (DBN). For example, the deep neural network (DNN), such as the convolutional neural network (CNN), can be provided in a controller 140 (see FIG. 7) of the robot 100.

The server 10 can train the deep neural network (DNN) based on the data received from the robot 100 and data input by a user, and can transmit the updated data of the deep neural network (DNN) to the robot 100. Consequently, the deep neural network (DNN) of artificial intelligence included in the robot 100 can be updated.

In addition, the usage-related data, which are data acquired as the result of using a predetermined product, for example, the robot 100, can include usage history data and sensing data acquired by a sensor unit 170 (see FIG. 7).

The trained deep neural network (DNN) can receive input data for recognition, can recognize the attributes of a person, an object, and a space included in the input data, and can output the result.

In addition, the trained deep neural network (DNN) can receive input data for recognition, and can analyze and train usage-related data of the robot 100 in order to recognize the usage pattern and the usage environment.

Meanwhile, the space-, object-, and usage-related data can be transmitted to the server 10 through a communication unit 190 (see FIG. 7).

The server 10 can train the deep neural network (DNN) based on the received data, and can transmit the updated data of the deep neural network (DNN) to the robot 100 such that the robot is updated.

Consequently, a user experience UX in which the robot 100 becomes smarter and evolves as the result of repetitive use can be provided.

The robot 100 and the server 10 can use external information. For example, the server 10 can synthetically use external information acquired from other service servers 20 and 30 connected thereto in order to provide an excellent user experience.

The server 10 can receive a speech input signal from a user in order to perform speech recognition. To this end, the server 10 can include a speech recognition module, and the speech recognition module can include an artificial neural network trained to perform speech recognition with respect to input data and to output the result of speech recognition.

In some embodiments, the server 10 can include a speech recognition server for speech recognition. In addition, the speech recognition server can include a plurality of servers for performing assigned tasks of the speech recognition. For example, the speech recognition server can include an automatic speech recognition (ASR) server for receiving speech data and converting the received speech data into text data and a natural language processing (NLP) server for receiving the text data from the automatic speech recognition server and analyzing the received text data in order to determine a speed command. Depending on circumstances, the speech recognition server can further include a text-to-speech (TTS) server for converting the text speech recognition result output by the natural language processing server into speech data and transmitting the speech data to another server or to another device.

According to the present invention, user speech can be used as an input for controlling the robot 100, since the robot 100 and/or the server 10 are capable of performing speech recognition.

In addition, according to the present invention, the robot 100 can actively provide information or output speech for recommending a function or a service first, whereby it is possible to provide more various and positive control functions to the user.

FIGS. 4, 5, and 6a to 6d are views showing robots according to embodiments of the present invention. The robots 100 can be disposed or can travel in specific spaces in order to perform given tasks.

Figure 4:
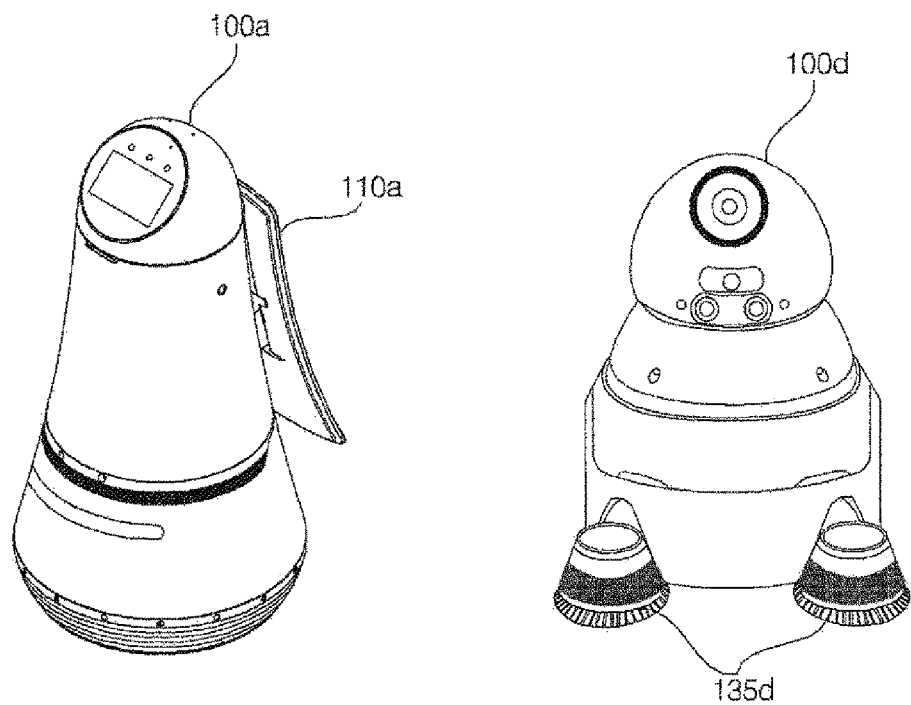
FIGS. 4, 5, and 6a to 6d are views showing robots according to embodiments of the present invention.

FIG. 4 shows mobile robots mainly used in public places. A mobile robot is a robot that autonomously moves using wheels. Consequently, the mobile robot can be a guide robot, a cleaning robot, an entertain robot, a home-help robot, or a guard robot. However, the present invention is not limited at to the kind of the mobile robot.

FIG. 4 shows a guide robot 100a and a cleaning robot 100d.

The guide robot 100a can include a display 110a in order to display a predetermined image, such as a user interface screen.

In addition, the guide robot 100a can display a user interface (UI) screen including events, advertisements, and guide information on the display 110a. The display 110a can be configured as a touchscreen so as to be used as an input means.

In addition, the guide robot 100a can receive user input, such as touch input or speech input, and can display information about an object or a place corresponding to the user input on the display 110a.

In some embodiments, the guide robot 100a can be provided with a scanner capable of recognizing a ticket, an airline ticket, a barcode, a QR code, etc. for guide.

In addition, the guide robot 100a can provide an escort service of guiding a user to a specific destination while moving to the specific destination in response to a user request.

The cleaning robot 100d can include a cleaning tool 135d, such as a brush, in order to clean a specific space while autonomously moving.

The mobile robots 100a and 100d can perform given tasks while traveling in specific spaces. The mobile robots 100a and 100d can perform autonomous traveling, in which the robots move while generating paths to specific destinations, or following traveling, in which the robots follow people or other robots. In order to prevent the occurrence of a safety-related accident, the mobile robots 100a and 100d can travel while avoiding obstacles sensed based on image data acquired by the image acquisition unit 120 or sensing data acquired by the sensor unit 170 during the movement thereof.

Figure 5:
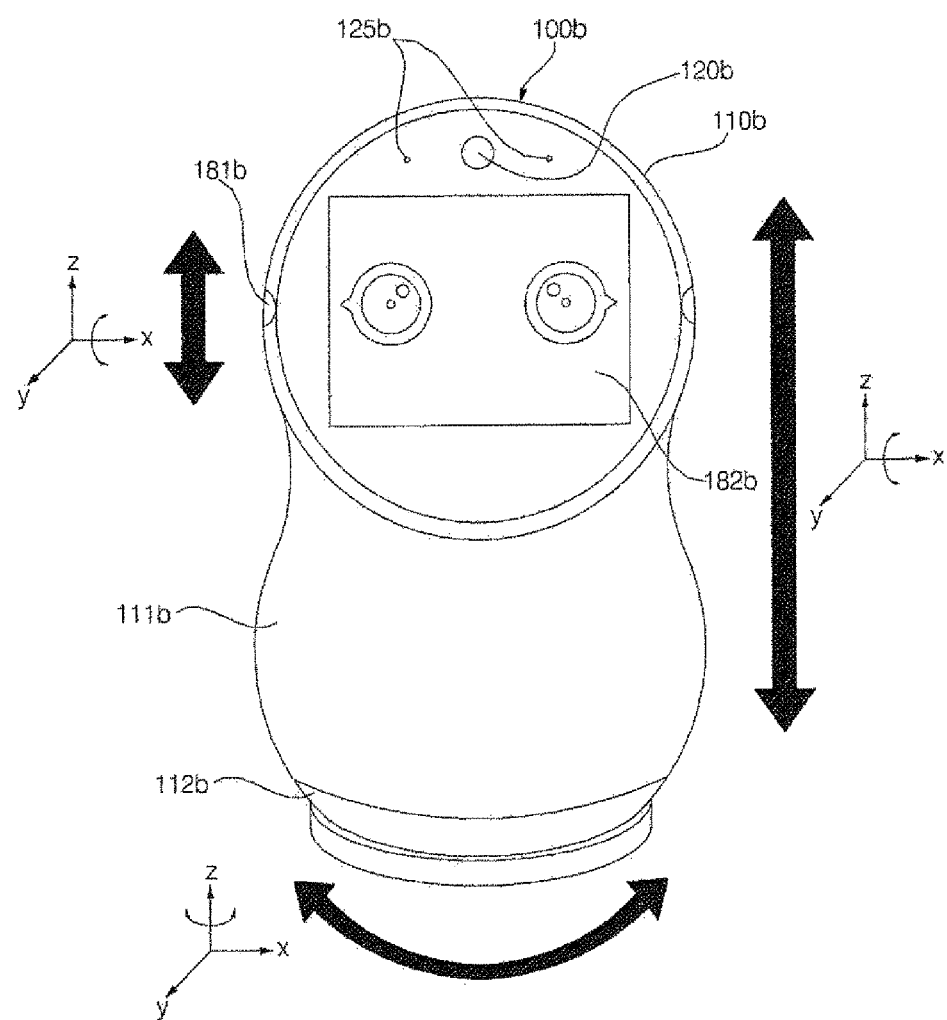
Figure 6A:
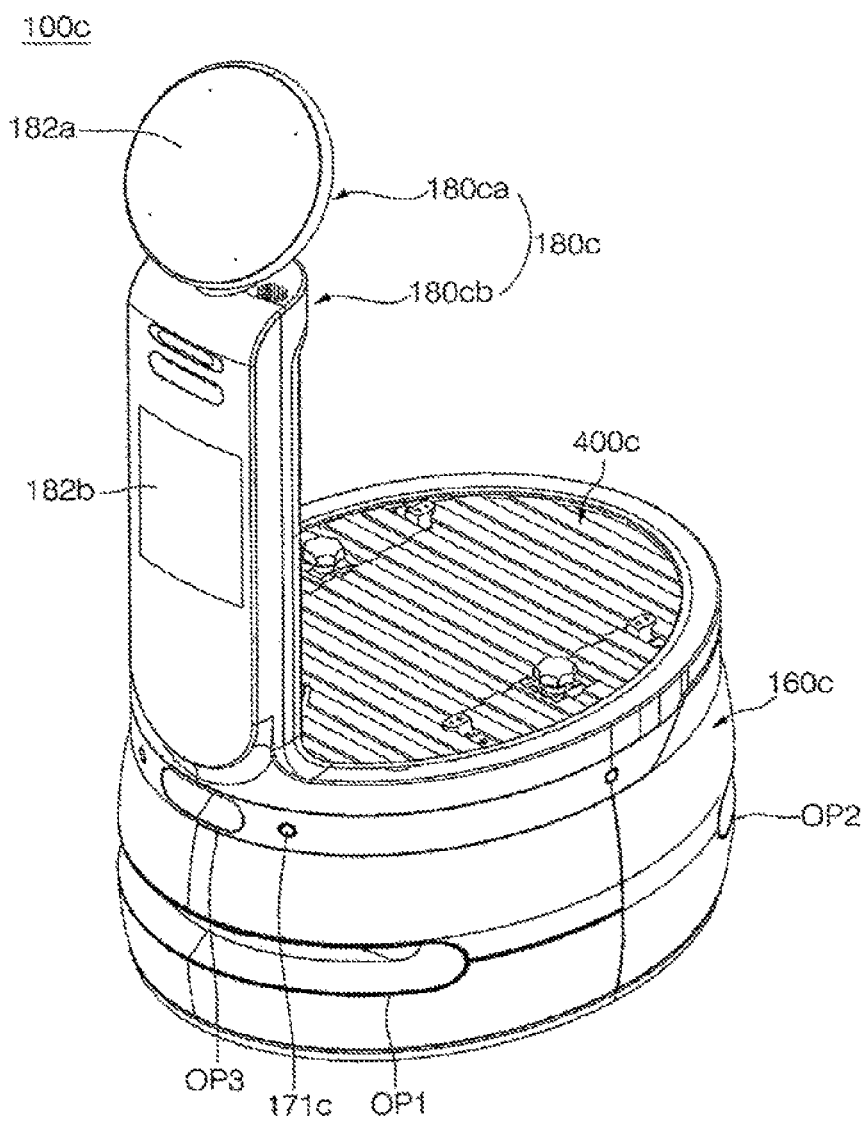
Figure 6B:
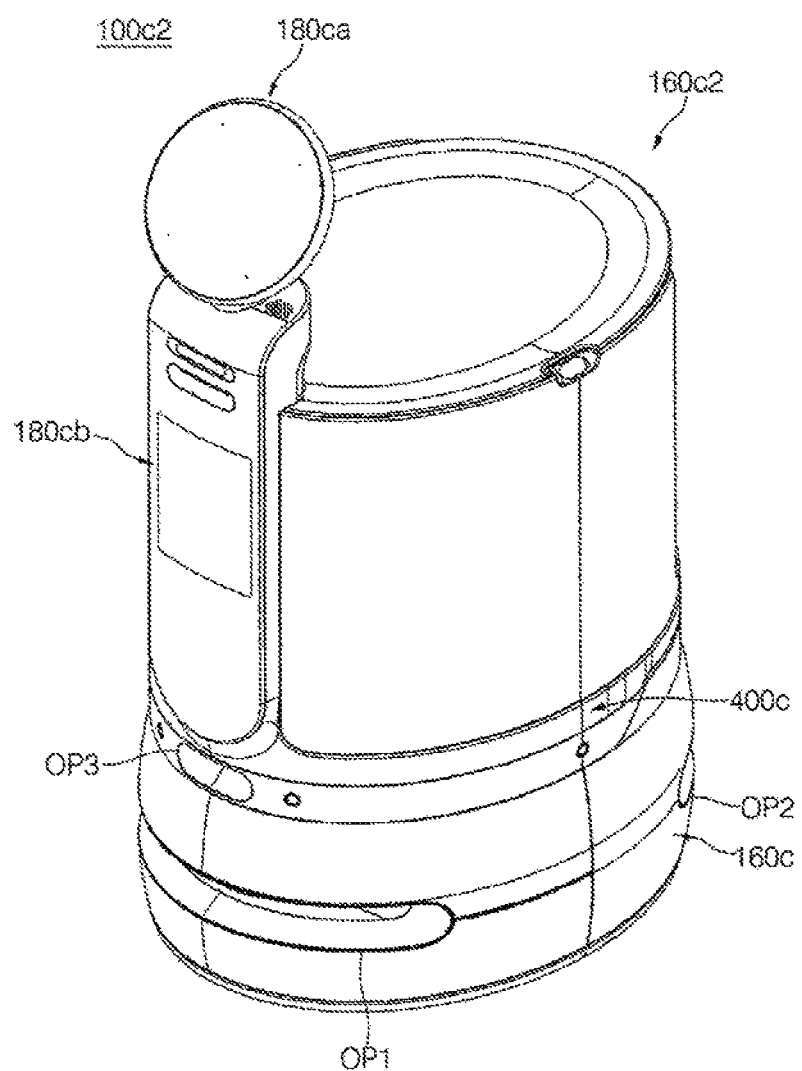
Figure 6C:
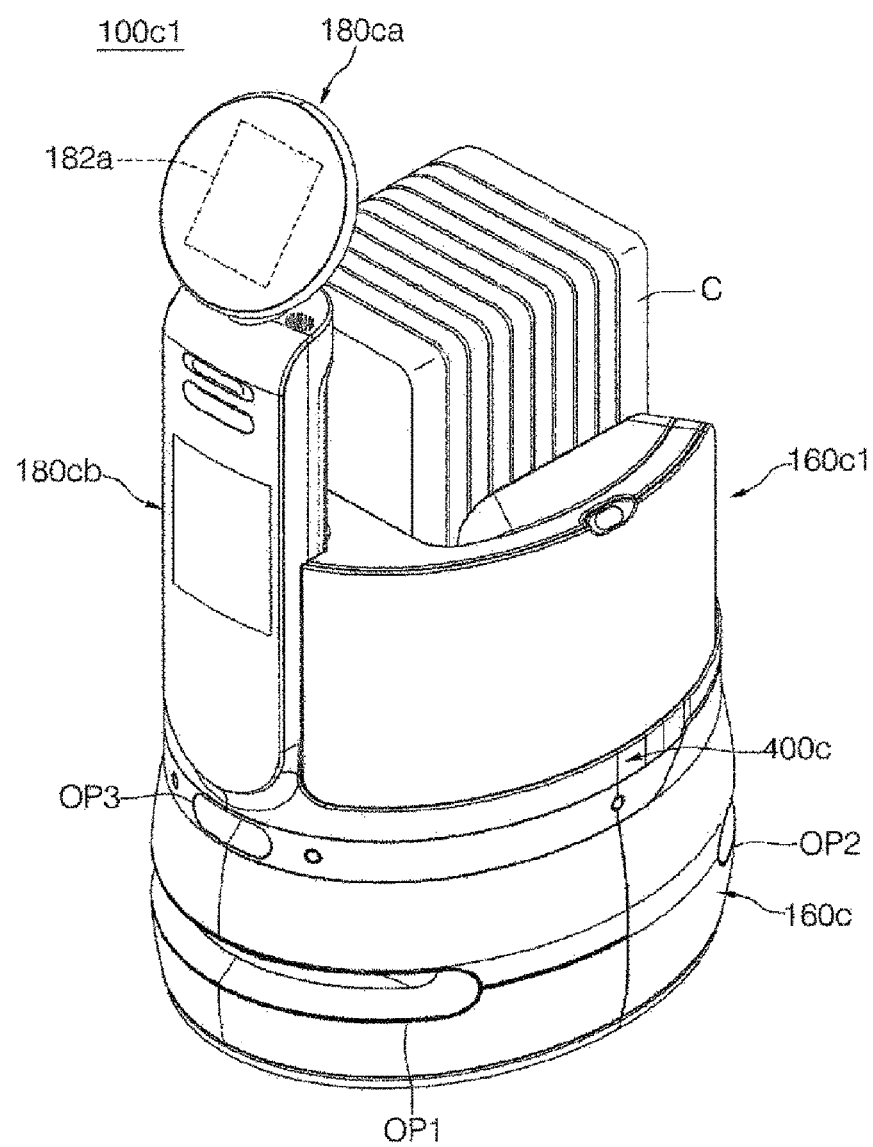
Figure 6D:
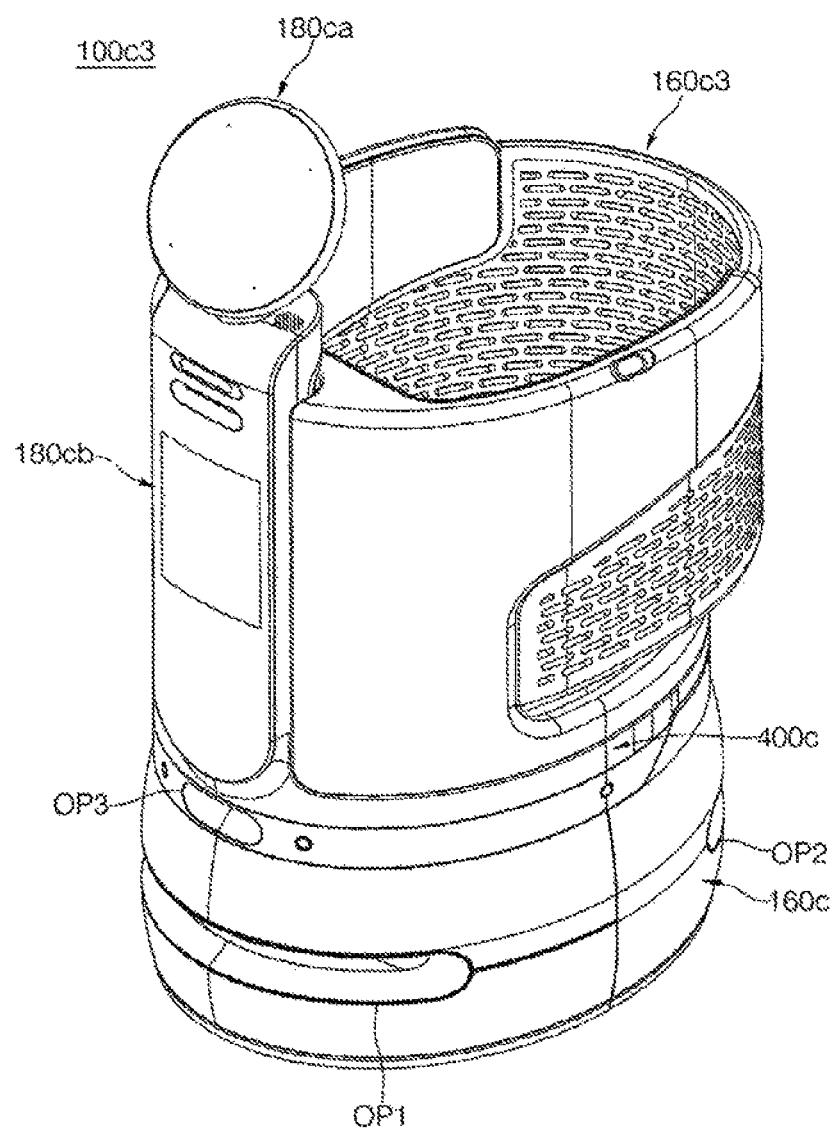

FIG. 5 is a front view showing the external appearance of a home robot according to an embodiment of the present invention.

Referring to FIG. 5, the home robot 100b includes main bodies 111b and 112b, which define the external appearance thereof and in which various components are received.

The main bodies 111b and 112b can include a body 111b, which defines a space for receiving various components constituting the home robot 100b, and a support unit 112b disposed at the lower side of the body 111b for supporting the body 111b.

In addition, the home robot 100b can include a head 110b disposed at the upper side of the main bodies 111b and 112b.

A display 182 for displaying an image can be disposed on the front surface of the head 110b.

In this specification, the forward direction can be a positive y-axis direction, the upward-downward direction can be a z-axis direction, and the leftward-rightward direction can be an x-axis direction.

The head 110b can be rotated about the x axis within a predetermined angle range.

When viewed from the front, therefore, the head 110b can nod in the upward-downward direction as if a human nodded in the upward-downward direction. For example, the head 110b can perform a rotation and return within a predetermined range once or more as if a human nodded in the upward-downward direction.

Meanwhile, in some embodiments, at least a portion of the front surface of the head 100b, on which the display 182, which can correspond to the face of the human, is disposed, can be configured to nod.

In this specification, therefore, an embodiment in which the entire head 110b is moved in the upward-downward direction will be described. Unless described particularly, however, the operation in which the head 110b nods in the upward-downward direction can be replaced by the operation in which at least a portion of the front surface of the head, on which the display 182 is disposed, nods in the upward-downward direction.

The body 111b can be configured to be rotatable in the leftward-rightward direction. That is, the body 111b can be configured to be rotatable 360 degrees about the z axis.

Also, in some embodiments, the body 111b can also be configured to be rotatable about the x axis within a predetermined angle range, whereby the body can move as if the body nodded in the upward-downward direction. In this case, as the body 111b rotates in the upward-downward direction, the head 110b can also be rotated about the axis about which the body 111b is rotated.

In this specification, therefore, the operation in which the head 110b nods in the upward-downward direction can include both the case in which the head 110b is rotated about a predetermined axis in the upward-downward direction when viewed from front and the case in which, as the body 111b nods in the upward-downward direction, the head 110b connected to the body 111b is also rotated and thus nods.

Meanwhile, the home robot 100b can include an image acquisition unit 120b for capturing an image of the circumference of the main bodies 111b and 112b, an image of at least a predetermined range from the front of the main bodies 111b and 112b.

The image acquisition unit 120b, which captures an image of the circumference of the main bodies 111b and 112b and an external environment, can include a camera module. A plurality of cameras can be provided at various positions in order to improve capture efficiency. Preferably, the image acquisition unit 120b can include a front camera provided at the front surface of the head 110b for capturing an image of the front of the main bodies 111b and 112b.

In addition, the home robot 100b can include a speech input unit 125b for receiving user speech input.

The speech input unit 125b can include or can be connected to a processing unit for converting analog sound into digital data such that a user speech input signal can be recognized by the server 10 or the controller 140.

The speech input unit 125b can include a plurality of microphones in order to improve accuracy in receiving user speech input and to determine the location of a user.

For example, the speech input unit 125b can include at least two microphones.

The microphones (MIC) can be disposed at different positions so as to be spaced apart from each other, and can acquire and convert an external audio signal including a speech signal into an electrical signal.

Meanwhile, at least two microphones, which are input devices, are required to estimate a sound source from which sound is generated and the orientation of a user. As the physical distance between the microphones increases, resolution (angle) in detecting the direction increases. In some embodiments, two microphones can be disposed at the head 110b. In addition, two microphones can be further disposed at the rear surface of the head 110b, whereby it is possible to determine the location of the user in a three-dimensional space.

In addition, sound output units 181b can be disposed at the left and right surfaces of the head 110b in order to output predetermined information as sound.

Meanwhile, the external appearance and structure of the robot shown in FIG. 5 are illustrative, and the present invention is not limited thereto. For example, the entire robot 110 can tilt or swing in a specific direction, unlike the rotational direction of the robot 100 shown in FIG. 5.

FIGS. 6a to 6d show delivery robots 100c, 100c1, 100c2, and 100c3 capable of delivering predetermined articles.

Referring to the figures, the delivery robots 100c, 100c1, 100c2, and 100c3 can move in an autonomous traveling mode or in a following traveling mode, and each of the delivery robots can move to a predetermined place while carrying a load, an article, or a carrier C. Depending on circumstances, each of the delivery robots can also provide an escort service of guiding a user to a specific place.

Meanwhile, the delivery robots 100c, 100c1, 100c2, and 100c3 can autonomously travel at specific places in order to guide people to specific positions or to deliver loads, such as baggage.

In addition, the delivery robots 100c, 100c1, 100c2, and 100c3 can follow users while maintaining a predetermined distance from the users.

In some embodiments, each of the delivery robots 100c, 100c1, 100c2, and 100c3 can include a weight sensor for sensing the weight of a load to be delivered, and can inform the user of the weight of the load sensed by the weight sensor.

A modular design can be applied to each of the delivery robots 100c, 100c1, 100c2, and 100c3 in order to provide services optimized depending on use environment and purpose.

For example, the basic platform 100c can include a traveling module 160c, which takes charge of traveling and includes wheels and a motor, and a UI module 180c, which takes charge of interaction with a user and includes a display, a microphone, and a speaker.

Referring to the figures, the traveling module 160c can include one or more openings OP1, OP2, and OP3.

The first opening OP1 is formed in the traveling module 160c such that a front lidar is operable, and can extend from the front to the side of the outer circumferential surface of the traveling module 160c.

The front lidar can be disposed in the traveling module 160c so as to face the first opening OP1. Consequently, the front lidar can emit a laser through the first opening OP1.

The second opening OP2 is formed in the traveling module 160c such that a rear lidar is operable, and can extend from the rear to the side of the outer circumferential surface of the traveling module 160c.

The rear lidar can be disposed in the traveling module 160c so as to face the second opening OP2. Consequently, the rear lidar can emit a laser through the second opening OP2.

The third opening OP3 is formed in the traveling module 160c such that a sensor disposed in the traveling module, such as a cliff sensor for sensing whether a cliff is present on a floor within a traveling area, is operable.

Meanwhile, a sensor can be disposed on the outer surface of the traveling module 160c. An obstacle sensor, such as an ultrasonic sensor 171c, for sensing an obstacle can be disposed on the outer surface of the traveling module 160c.

For example, the ultrasonic sensor 171c can be a sensor for measuring the distance between an obstacle and each of the delivery robots 100c, 100c1, 100c2, and 100c3 using an ultrasonic signal. The ultrasonic sensor 171c can sense an obstacle that is near each of the delivery robots 100c, 100c1, 100c2, and 100c3.

In an example, a plurality of ultrasonic sensors 171c can be provided in order to sense obstacles that are near each of the delivery robots 100c, 100c1, 100c2, and 100c3 in all directions. The ultrasonic sensors 171c can be located along the circumference of the traveling module 160c so as to be spaced apart from each other.

In some embodiments, the UI module 180c can include two displays 182a and 182b, and at least one of the two displays 182a and 182b can be configured as a touchscreen so as to be used as an input means.

In addition, the UI module 180c can further include the camera of the image acquisition unit 120. The camera can be disposed on the front surface of the UI module 180c in order to acquire image data of a predetermined range from the front of the UI module 180c.

In some embodiments, at least a portion of the UI module 180c can be configured so as to be rotatable. For example, the UI module 180c can include a head unit 180ca rotatable in the leftward-rightward direction and a body unit 180cb for supporting the head unit 180ca.

The head unit 180ca can be rotated based on the operation mode and the current state of each of the delivery robots 100c, 100c1, 100c2, and 100c3.

In addition, the camera can be disposed at the head unit 180ca in order to acquire image data of a predetermined range in the direction in which the head 180a is oriented.

For example, in the following traveling mode, in which each of the delivery robots 100c, 100c1, 100c2, and 100c3 follows a user, the head unit 180ca can be rotated so as to face forwards. In addition, in the guide mode, in which each of the delivery robots 100c, 100c1, 100c2, and 100c3 provides an escort service of guiding a user to a predetermined destination while moving ahead of the user, the head unit 180ca can be rotated so as to face rearwards.

In addition, the head unit 180ca can be rotated so as to face a user identified by the camera.

The porter robot 100c1 can further include a delivery service module 160c1 for receiving a load in addition to the components of the basic platform 100c. In some embodiments, the porter robot 100c1 can be provided with a scanner capable of recognizing a ticket, an airline ticket, a barcode, a QR code, etc. for guide.

The serving robot 100c2 can further include a serving service module 160c2 for receiving serving articles in addition to the components of the basic platform 100c. For example, serving articles in a hotel can be towels, toothbrushes, toothpaste, bathroom supplies, bedclothes, drinks, foods, room services, or other small electronic devices. The serving service module 160c2 can be provided with a space for receiving serving articles in order to stably deliver the serving articles. In addition, the serving service module 160c2 can be provided with a door for opening and closing the space for receiving the serving articles, and the door can be manually and/or automatically opened and closed.

The cart robot 100c3 can further include a shopping cart service module 160c3 for receiving customer's shopping articles in addition to the components of the basic platform 100c. The shopping cart service module 160c3 can be provided with a scanner capable of recognizing a barcode, a QR code, etc. of each shopping article.

Each of the service modules 160c1, 160c2, and 160c3 can be mechanically coupled to the traveling module 160c and/or the UI module 180c. In addition, each of the service modules 160c1, 160c2, and 160c3 can be electrically coupled to the traveling module 160c and/or the UI module 180 in order to transmit and receive a signal. Consequently, cooperative operation is achieved.

To this end, each of the delivery robots 100c, 100c1, 100c2, and 100c3 can include a coupling unit 400c for coupling the traveling module 160c and/or the UI module 180 to a corresponding one of the service modules 160c1, 160c2, and 160c3.

FIG. 7 shows an example of a simple internal block diagram of a robot according to an embodiment of the present invention.

Referring to FIG. 7, the robot 100 according to the embodiment of the present invention can include a controller 140 for controlling the overall operation of the robot 100, a storage unit 130 for storing various kinds of data, and a communication unit 190 for transmitting and receiving data to and from another device, such as the server 10.

The controller 140 can control the storage unit 130, the communication unit 190, a driving unit 160, a sensor unit 170, and an output unit 180 in the robot 100, whereby the controller can control the overall operation of the robot 100.

The storage unit 130, which stores various kinds of information necessary to control the robot 100, can include a volatile or nonvolatile recording medium. Examples of the recording medium, which stores data readable by a microprocessor, can include a hard disk drive (HDD), a solid state disk (SSD), a silicon disk drive (SDD), a ROM, a RAM, a CD-ROM, a magnetic tape, a floppy disk, and an optical data storage device.

Meanwhile, the controller 140 can perform control such that the operation state of the robot 100 or user input is transmitted to the server 10 through the communication unit 190.

The communication unit 190 can include at least one communication module, through which the robot 100 can be connected to the Internet or to a predetermined network and can communicate with another device.

In addition, the communication unit 190 can be connected to a communication module provided in the server 10 in order to process transmission and reception of data between the robot 100 and the server 10.

The robot 100 according to the embodiment of the present invention can further include a speech input unit 125 for receiving user speech input through a microphone.

The speech input unit 125 can include or can be connected to a processing unit for converting analog sound into digital data such that a user speech input signal can be recognized by the controller 140 or the server 10.

Meanwhile, the storage unit 130 can store data for speech recognition, and the controller 140 can process the user speech input signal received through the speech input unit 125, and can perform a speech recognition process.

Meanwhile, the speech recognition process can be performed by the server 10, not by the robot 100. In this case, the controller 140 can control the communication unit 190 such that the user speech input signal is transmitted to the server 10.

Alternatively, simple speech recognition can be performed by the robot 100, and high-dimensional speech recognition, such as natural language processing, can be performed by the server 10.

For example, in the case in which speech input including a predetermined keyword is received, the robot 100 can perform the operation corresponding to the keyword, the speech input excluding the keyword can be performed through the server 10. Alternatively, the robot 100 can perform merely wake-up word recognition for activating a speech recognition mode, and subsequent speech recognition of the user speech input can be performed through the server 10.

Meanwhile, the controller 140 can perform control such that the robot 100 performs a predetermined operation based on the result of speech recognition.

Meanwhile, the robot 100 can include an output unit 180 in order to display predetermined information in the form of an image or to output the predetermined information in the form of sound.

The output unit 180 can include a display 182 for displaying information corresponding to user command input, processing result corresponding to the user command input, the operation mode, the operation state, and the error state in the form of an image. In some embodiments, the robot 100 can include a plurality of displays 182.

In some embodiments, at least some of the displays 182 can be connected to a touchpad in a layered structure so as to constitute a touchscreen. In this case, the display 182 constituting the touchscreen can also be used as an input device for allowing a user to input information by touch, in addition to an output device.

In addition, the output unit 180 can further include a sound output unit 180 for outputting an audio signal. The sound output unit 180 can output an alarm sound, a notification message about the operation mode, the operation state, and the error state, information corresponding to user command input, and a processing result corresponding to the user command input in the form of sound under the control of the controller 140. The sound output unit 180 can convert an electrical signal from the controller 140 into an audio signal, and can output the audio signal. To this end, a speaker can be provided.

In some embodiments, the robot 100 can further include an image acquisition unit 120 for capturing an image of a predetermined range.

The image acquisition unit 120, which captures an image of the periphery of the robot 100, an external environment, etc., can include a camera module. For capture efficiency, a plurality of cameras can be installed at predetermined positions.

The image acquisition unit 120 can capture an image for user recognition. The controller 140 can determine an external situation or can recognize a user (a target to be guided) based on the image captured by the image acquisition unit 120.

Also, in the case in which the robot 100 is a mobile robot, i.e. one of the guide robot 100a, the delivery robots 100c, 100c1, 100c2, and 100c3, and the cleaning robot 100d, the controller 140 can perform control such that the robot 100 travels based on the image captured by the image acquisition unit 120.

Meanwhile, the image captured by the image acquisition unit 120 can be stored in the storage unit 130.

In the case in which the robot 100 is a mobile robot, i.e. one of the guide robot 100*a*, the delivery robots 100*c*, 100*c*1, 100*c*2, and 100*c*3, and the cleaning robot 100*d*, the robot 100 can further include a driving unit 160 for movement. The driving unit 160 can move the main bodies under the control of the controller 140.

The driving unit 160 can include at least one driving wheel for moving the main bodies of the robot 100. The driving unit 160 can include a driving motor connected to the driving wheel for rotating the driving wheel. Driving wheels can be provided at left and right sides of the main bodies, and will hereinafter be referred to as a left wheel and a right wheel.

The left wheel and the right wheel can be driven by a single driving motor. If necessary, however, a left wheel driving motor for driving the left wheel and the right wheel driving motor for driving the right wheel can be individually provided. The direction in which the main body travels can be changed to the left or to the right based on the difference in the rotational speed between the left wheel and the right wheel.

An immobile robot 100, such as the home robot 100*b*, can include a driving unit 160 for performing a predetermined action, as described with reference to FIG. 5.

In this case, the driving unit 160 can include a plurality of driving motors for rotating and/or moving the body 111*b* and the head 110*b*.

Meanwhile, the robot 100 can include a sensor unit 170 including sensors for sensing various kinds of data related to the operation and state of the robot 100.

The sensor unit 170 can further include an operation sensor for sensing the operation of the robot 100 and outputting operation information. For example, a gyro sensor, a wheel sensor, or an acceleration sensor can be used as the operation sensor.

The sensor unit 170 can include an obstacle sensor for sensing an obstacle. The obstacle sensor can include an infrared sensor, an ultrasonic sensor, an RF sensor, a geomagnetic sensor, a position sensitive device (PSD) sensor, a cliff sensor for sensing whether a cliff is present on a floor within a traveling area, and a lidar (light detection and ranging).

Meanwhile, the obstacle sensor senses an object, particularly an obstacle, present in the direction in which the mobile robot 100 travels (moves), and transmits information about the obstacle to the controller 140. At this time, the controller 140 can control the motion of the robot 100 depending on the position of the sensed obstacle.

Figure 8A:
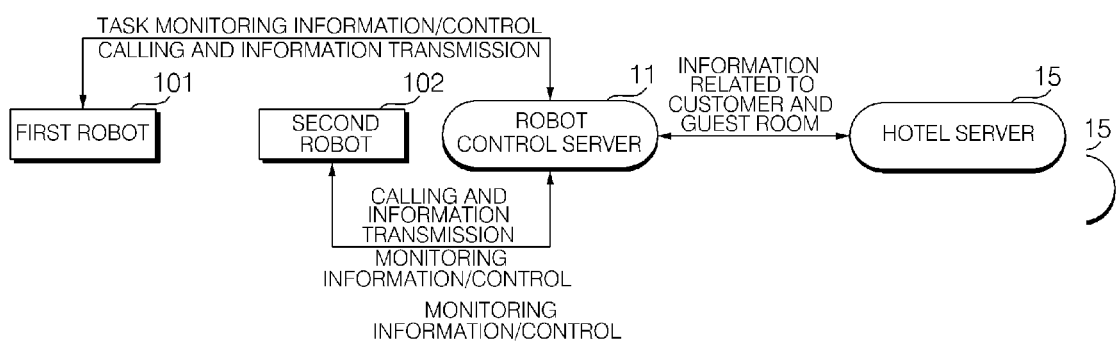
FIG. 8a is a reference view illustrating a cooperation system between robots via a server according to an embodiment of the present invention.

FIG. 8*a* is a reference view illustrating a cooperation system between robots via a server according to an embodiment of the present invention.

Referring to FIG. 8*a*, a first robot 101 and a second robot 102 can communicate with the control server 11.

The first robot 101 and the second robot 102 can transmit various kinds of information, such as user request particulars and state information, to the control server 11.

In addition, the control server 11 can control the first robot 101 and the second robot 102, and can monitor the state of the first robot 101 and the second robot 102 and the process in which the first robot 101 and the second robot 102 are performing the tasks.

The first robot 101 can receive user input for requesting a predetermined service. The first robot 101 can call another robot to request task support therefrom based on the user request service, and can transmit information related to the user request particulars to the control server 11.

The control server 11 can check the current state information of robots, and can identify a supporting robot capable of supporting the task requested by the first robot 101.

For example, the control server 11 can select the supporting robot from among the robots based on at least one of whether the robots are performing tasks, the distances between the robots and the first robot 101, or times at which the robots are expected to finish the current tasks.

In the case in which the second robot 101 is selected as the supporting robot, the control server 11 can call the second robot 102 to request supporting of the task, and can transmit the information related to the user request particulars to the second robot 102. In response to the calling of the first robot 101, the second robot 102 can perform supporting of the task, which becomes a duty of the second robot 102.

The control server 11 can monitor and control the operation of the second robot 102 that is performing the duty.

Depending on circumstances, the control server 11 can transmit information indicating that the second robot 102 is supporting the task to the first robot 101.

Meanwhile, the control server 11 can transmit and receive information to and from a server 15 of a product or service provider, such as a hotel or a restaurant. In this case, the control server 11 can receive information related to the hotel or the restaurant from the server 15 of the product or service provider, such as the hotel or the restaurant, and can transmit information necessary to perform the task to the first robot 101 and/or the second robot 102.

For example, the server 15 of the hotel service provider can provide hotel room information, environment information, and customer information, and the server 15 of the restaurant service provider can provide restaurant table information, environment information, and customer information.

Figure 8B:
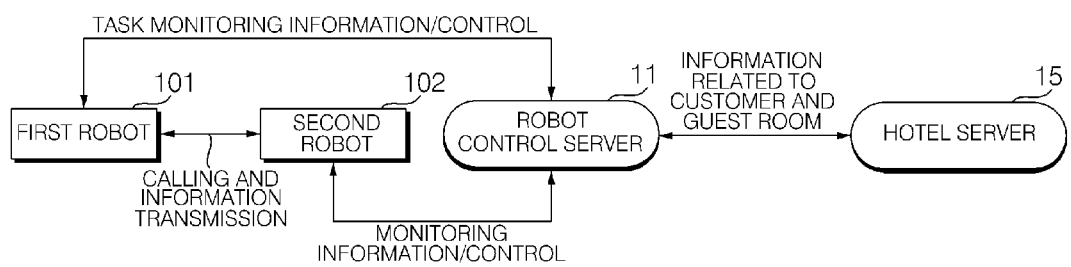
FIG. 8b is a reference view illustrating a cooperation system between robots according to an embodiment of the present invention.

FIG. 8*b* is a reference view illustrating a cooperation system between robots according to an embodiment of the present invention.

Referring to FIG. 8*b*, the first robot 101 can receive user input for requesting a predetermined service. The first robot 101 can directly call another robot to request task support therefrom based on the user request service.

The first robot 101 can check the current state information of robots, and can identify a supporting robot capable of supporting the task. For example, the first robot 101 can select the supporting robot from among the robots based on at least one of whether the robots are performing tasks, the distances between the robots and the first robot 101, or times at which the robots are expected to finish the current tasks.

To this end, the first robot 101 can receive state information of the robots from the control server 11.

Alternatively, the first robot 101 can transmit a signal requesting the task support to other robots, and can select the supporting robot from among the robots that have transmitted a response signal.

In this case, the signal transmitted by the first robot 101 can include information about the location of the first robot 101 or the place at which the service is provided and user request particulars. In addition, the response signal transmitted by the robots can include location information and state information of the robots.

The first robot 101 can check the information included in the response signal in order to select the supporting robot based on predetermined criteria. In this embodiment, cooperation can be achieved even in the case in which the server 10 malfunctions or communication between the server 10 and the first robot 101 is poor.

In the case in which the second robot 101 is selected as the supporting robot, the first robot 101 can call the second robot 102 to request supporting of the task, and can transmit the information related to the user request particulars to the second robot 102. In response to the calling of the first robot 101, the second robot 102 can perform supporting of the task, which becomes a duty of the second robot 102.

Meanwhile, even in this embodiment, the first robot 101 and the second robot 102 can communicate with the control server 11.

The first robot 101 and the second robot 102 can transmit various kinds of information, such as state information, to the control server 11, and the control server 11 can monitor and control the state of the first robot 101 and the second robot 102 and the process in which the first robot 101 and the second robot 102 are performing the tasks.

Even in this case, the control server 11 can transmit and receive information to and from the server 15 of the service provider, such as the hotel or the restaurant. For example, the control server 11 can receive information related to the hotel or the restaurant from the server 15 of the service provider, such as the hotel or the restaurant, and can transmit information necessary to perform the task to the first robot 101 and/or the second robot 102.

Meanwhile, the control server 11 can be an RSDP 10 according to an embodiment of the present invention, or can be one of the servers included in the RSDP 10. Consequently, the operation of the control server 11 described with reference to FIGS. 8a and 8b can be performed by the RSDP 10. In addition, as previously described, the RSDP 10 can be configured as a plurality of servers, to which information and functions are distributed, or as a single integrated server.

In FIGS. 8a and 8b, the first robot 101 and the second robot 102, which cooperate with each other, can be the same kind of robots. More preferably, the first robot 101 and the second robot 102 are different kinds of robots. For example, the first robot 101 can be the guide robot 100a or the home robot 100b, which outputs predetermined information in the form of an image and speech in order to interact with a user, and the second robot 102 can be one of the delivery robots 100c1, 100c2, and 100c3, such as the serving robot 100c2, which is capable of delivering a predetermined article.

Robots can have different hardware performances and can provide different services depending on the kind thereof. In the case in which different kinds of robots are combined so as to cooperate with each other, therefore, it is possible to provide more various and abundant services.

According to the present invention, cooperation between robots can be possible at an airport or a hotel, and intervention of an administrator can be minimized when the cooperative task is performed, whereby administration cost and time can be reduced and thus use convenience can be improved.

Figure 9:
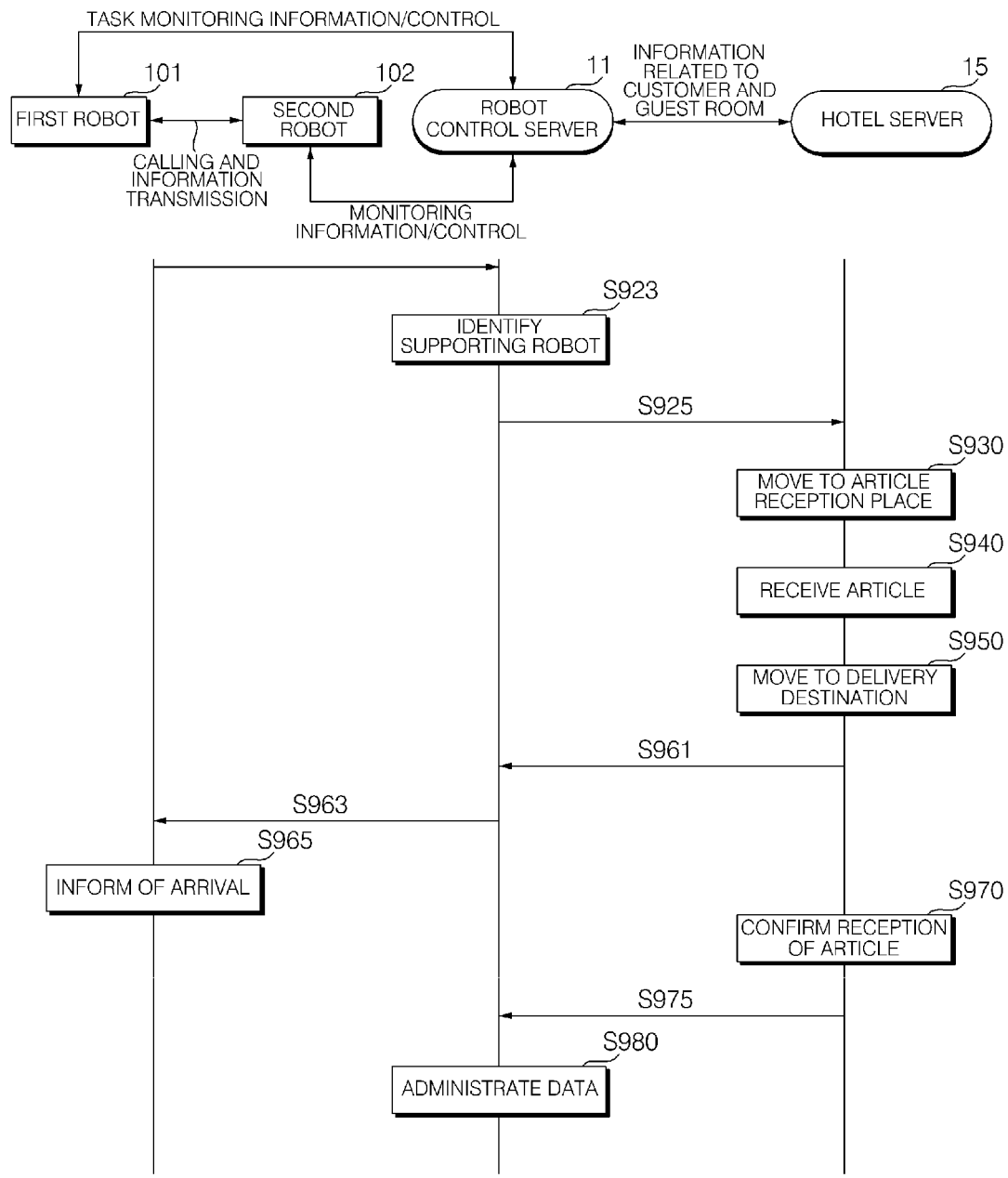
FIG. 9 is a flowchart showing a method of controlling a robot system according to an embodiment of the present invention.

FIG. 9 is a flowchart showing a method of controlling a robot system according to an embodiment of the present invention.

Referring to FIG. 9, in 910 step, the first robot 101 can receive user input for requesting a predetermined service. The first robot 101 can receive user touch input or user speech input in order to identify a service corresponding to the user input. For example, the first robot 101 can identify a user request for a delivery service of a predetermined article from the user touch input or the user speech input. In this specification, the delivery service can mean all services of delivering a predetermined article to a specific place in response to a customer request service, such as a hotel room service and a restaurant food delivery service.

In 912 step, the first robot 101 can transmit information based on the user input to the server 10. Here, the information based on the user input can include information about the location of the first robot 101 or the place at which the service is provided and user request particulars. For example, in the case in which a user requests a delivery service of delivering a predetermined article to a predetermined guest room or a predetermined table, the first robot 101 can transmit information about the current location of the first robot 101, delivery destination information, and delivery service request information to the server 10.

In some embodiments, the user can request a room service or a delivery service using a telephone disposed at a specific place (for example, a guest room telephone), a tablet PC, or a TV.

Meanwhile, in 923 step, the server 10 can identify a supporting robot capable of supporting a task corresponding to the delivery service request.

The server 10 can select the supporting robot from among a plurality of robots included in the robot system based on at least one of whether the robots are performing tasks, the distances between the robots and the first robot 101, or times at which the robots are expected to finish the current tasks.

For example, the server 10 can select a robot that has finished the task and is on standby as the supporting robot. In the case in which a plurality of robots is on standby, the server 10 can select a robot that is the closest to the first robot 101, among the robots that are on standby, as the supporting robot.

Also, in the case in which all of the robots are performing the tasks, the server 10 can select a robot expected to finish the task the earliest as the supporting robot.

Also, in the case in which a robot that is on standby is far away and in the case in which the sum of the time at which a robot that is performing a task is expected to finish the task and the time taken for the robot that is performing the task to move to the place at which the first robot 101 is located is less than the time taken for the robot that is on standby to move to the place at which the first robot 101 is located, the robot that is performing the task can be selected as the supporting robot.

According to the present invention, it is possible to select a supporting robot suitable to perform a task corresponding to the user request service and to efficiently administrate robots.

The server 10 can identify the second robot 102 as the supporting robot based on the above criteria. The first robot 101 and the second robot 102 can be the same kind of robots. More preferably, the first robot 101 and the second robot 102 are different kinds of robots. For example, the first robot 101 can be the guide robot 100a or the home robot 100b, which outputs predetermined information in the form of an image and speech in order to interact with a user, and the second robot 102 can be one of the delivery robots 100c1, 100c2, and 100c3, such as the serving robot 100c2, which is capable of delivering a predetermined article.

The serving robot 100c2 can move in an autonomous traveling mode or in a following traveling mode, and can support a serving article delivery service, an escort service, etc. The serving robot 100c2 can include a serving service module 160c2 for receiving serving articles in order to stably deliver the serving articles. Meanwhile, serving articles in a hotel can be towels, toothbrushes, toothpaste, bathroom supplies, bedclothes, drinks, foods, room services, or other small-sized electronic devices.

Meanwhile, in 925 step, the server 10 can request a task of article delivery or escort from the second robot 102 identified as the supporting robot.

At this time, a signal that the server 10 transmits while requesting task support from the second robot 102 can include information about the task to be supported. For example, a signal transmitted to the second robot 102 can include information about the location of the first robot 101, the place at which the service is provided, an article reception place, a delivery destination, user request particulars, and a surrounding environment.

Meanwhile, in 940 step, the second robot 102 can receive the article, and can move to the delivery destination included in the delivery request in 910 step.

Here, the delivery destination can be the place at which the first robot 101 is located or a specific place included in the user input.

In the case in which the delivery destination is not specified, the place at which the first robot 101 is located can be set as the delivery destination by default. Also, in the case in which the user inputs a specific place through touch input or speech input, the input place can be set as the delivery destination.

In the case in which the place designated as the delivery destination is included in the delivery request, the second robot 102 can move to the designated place. In the case in which the place designated as the delivery destination is not included in the delivery request, the second robot 102 can move to the place at which the first robot 101 is located.

Alternatively, the server 10 can automatically set the delivery destination using the customer information, the guest room information, etc.

In some embodiments, the second robot 102 can be on standby at a place at which a predetermined article is stored. In this case, the second robot 102 can receive an article to be served, and can perform a delivery task.

Since there are various kinds of articles to be delivered, the articles can be stored at several places in a distributed manner, and therefore there can be no article to be delivered at the current position at which the second robot 102 is located. In this case, in 930 step, the second robot 102 can move to the article reception place in order to receive the article.

Meanwhile, upon arriving at the article reception place, the second robot 102 can output a message informing of the delivery request particulars in the form of an image and/or sound.

For example, the second robot 102 can display the article included in the delivery request particulars, i.e. the article to be delivered, and the quantity thereof on the display 182. In addition, the second robot 102 can output a message informing of the article to be delivered and the quantity thereof through the sound input unit 181 in the form of speech.

Upon confirming the reception of the article in 940 step, the second robot 102 can move to the delivery destination in 950 step.

The confirmation of the reception of the article can be automatically performed using the weight sensor or the camera provided at the second robot 102.

Alternatively, in the case in which touch input, speech input, or another predetermined manipulation is performed by a staff member, the second robot 102 can determine that the article has been received.

Alternatively, in the case in which the staff member informs the server 10 of the reception of the article using an electronic device, the server 10 can inform the second robot 102 and/or the first robot 101 that the reception of the article has been completed.

Meanwhile, upon arriving at the delivery destination, the second robot 102 can transmit a signal informing of arrival at the delivery destination to the server 10 (S961), and the server 10 can transmit a signal informing that the second robot 102 has arrived at the delivery destination to the first robot 101 in 963 step.

Consequently, in 965 step, the first robot 101 can output a message informing that the second robot 102 has arrived at the delivery destination in order to inform the customer of the arrival of the article to be served. In the case in which the delivery of a convenience article to a guest room is requested, the customer can open a door of the guest room in order to receive the article to be served.

In some embodiments, the second robot 102 can output a message informing of arrival at the delivery destination through the output unit 180 in the form of an image and/or sound.

Upon confirming the reception of the article in 970 step, the second robot 102 can report the completion of the task to the server 10 in 975 step. The report on the task completion can include information about whether the task has been successfully performed, the details of the task, and the time taken to perform the task.

Upon receiving the report on the task completion, the server 10 can update data corresponding to the first robot 101 and the second robot 102 based on the report on the task completion, and can administrate the data in 980 step. For example, the number of times that the first robot 101 and the second robot 102 have performed the task can be increased, and information about the details of the task, such as the kind of the task and the time taken to perform the task, can be updated. Consequently, data related to the robots can be effectively administrated, and the server 10 can analyze and learn the data related to the robots.

In some embodiments, the confirmation of the reception of the article can be automatically performed using the recognition means provided at the second robot 102, such as the weight sensor or the camera.

Alternatively, in the case in which touch input, speech input, or another predetermined manipulation is performed by the customer, the second robot 102 can determine that the article has been received.

Alternatively, in the case in which the customer informs the server 10 of the reception of the article using an electronic device, the server 10 can inform the second robot 102 and/or the first robot 101 that the reception of the article has been completed.

Figure 10:
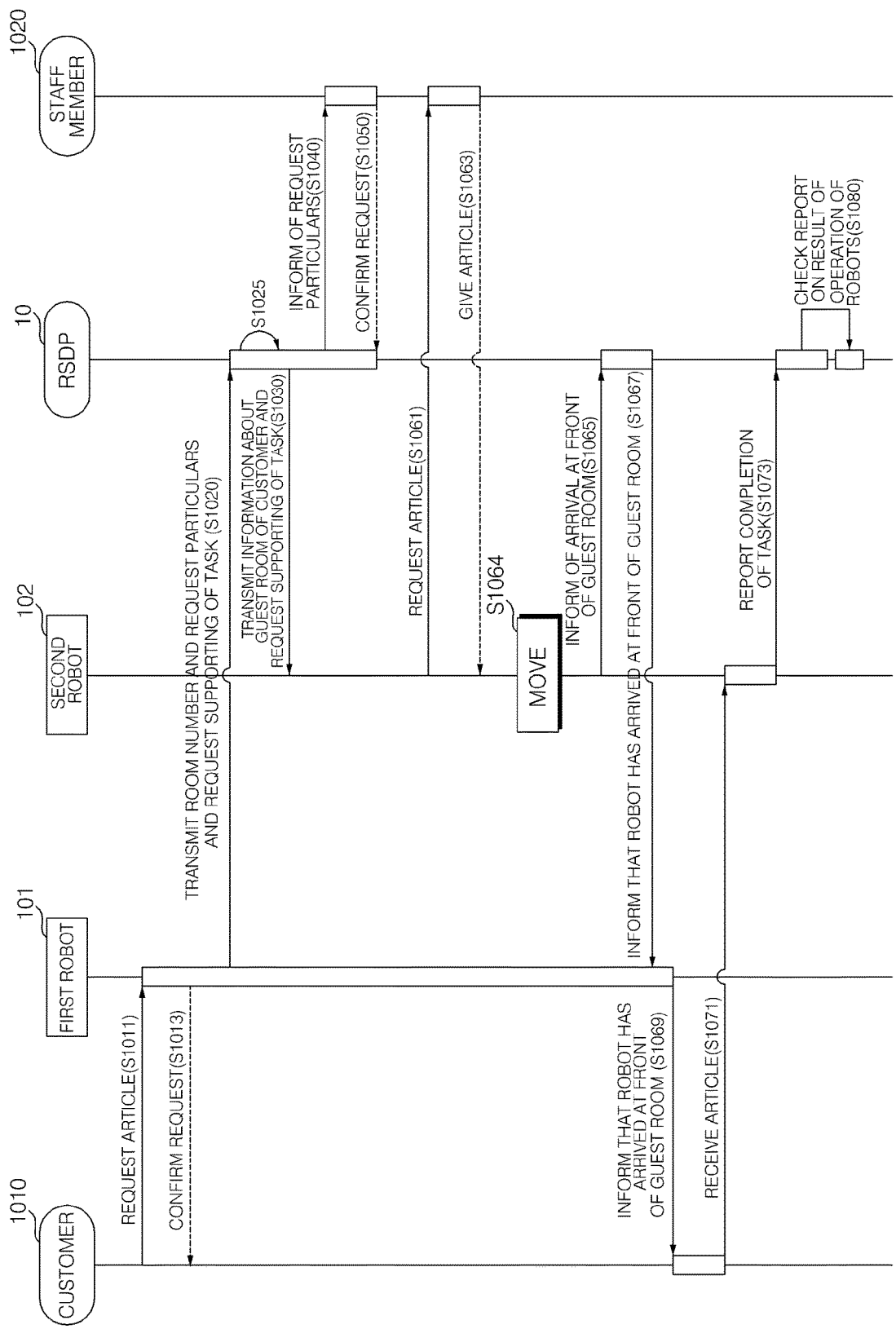
FIG. 10 is a flowchart showing the case in which an article is delivered to a hotel room according to an embodiment of the present invention.

FIG. 10 is a flowchart showing the case in which an article is delivered to a hotel room according to an embodiment of the present invention.

Referring to FIG. 10, in 1011 step, a customer 1010 who lodges in a hotel room can request a predetermined article, such as a convenience article or a room service, and the first robot 101 can transmit customer request particulars to the server 10 and can request supporting of the delivery task of the article requested by the customer from the server 10 in 1020 step. At this time, the first robot 101 can transmit information about the room number, the title of the article requested by the customer, and the quantity of the article to the server 10. Alternatively, the server 10 can know the position at which the first robot 101 is located in advance. In this case, the first robot 101 may not transmit information about the room number.

According to settings, in 1013 step, the first robot 101 can confirm the article request from the customer 1010.

The server 10 can identify a supporting robot that supports the delivery service task requested by the first robot 101 according to determined criteria in 1025 step.

In the case in which the second robot 102 is selected as the supporting robot, in 1030 step, the server 10 can transmit the customer request particulars to the second robot 102, and can request supporting of the delivery task. If necessary, the server 10 can also transmit information about an article reception place to the second robot 102.

More preferably, the server 10 also transmits the customer request particulars to a staff member 1020 who manages the article to be delivered in 1040 step. For example, the server 10 can transmit the customer request particulars and a message indicating that the second robot 102 should deliver the article to an electronic device of the staff member 1020.

The staff member 1020 can manipulate their own electronic device in order to confirm and input the request particulars of the server 10 in 1050 step, and, when the second robot 102 that is on standby at the article reception place or has arrived at the article reception place requests the article in 1061 step, can give the article to the second robot 102 in 1063 step.

For example, the second robot 102 can move to a warehouse storing towels in order to receive a towel and to deliver the towel to the customer. At this time, the server 10 can also transmit the service request of the user who wants the towel to the staff member 1020 of the warehouse.

Meanwhile, after arriving at the warehouse, the second robot 102 can output information about the delivery destination and the article, such as "two towels are needed for room X" in the form of an image and/or speech.

The staff member 1020 can push an opening hard key or a confirmation (or open) button on an interface screen displayed by the second robot 102 or can perform a speech input operation in order to open a door that is capable of opening and closing a space in the second robot 102 for receiving the article.

The staff member 1020 can put two towels into the space in the second robot 102 for receiving the article, and can then close the door. Even in this case, the staff member can push a closing hard key or a confirmation (or close) button on the interface screen displayed by the second robot 102 or can perform a speech input operation in order to close the door.

Subsequently, the second robot 102 can move to the delivery destination, i.e. the guest room in which the customer 1010 lodges, while carrying the article requested by the customer 1010 in 1064 step.

When the movement of the second robot 102 to the delivery destination, i.e. the guest room, is completed, the second robot 102 can transmit a signal informing of the arrival at the front of the guest room to the server 10 in 1065 step, and the server 10 can transmit a signal informing that the second robot 102 has arrived at the front of the guest room to the first robot 101 in 1067 step.

The first robot 101 can output a message informing that the second robot 102 has arrived at the delivery destination in order to inform the customer 1010 that the second robot 102 has arrived at the front of the guest room in 1069 step. The customer 1010 can open a door of the guest room, and can receive the requested article in 1071 step.

Upon confirming the reception of the article in 1071 step, the second robot 102 can report the completion of the task to the server 10 in 1073 step.

The server 10 can check the report on the result of operation of the first robot 101 and the second robot 102, and can store and administrate data in 1080 step.

Figure 11:
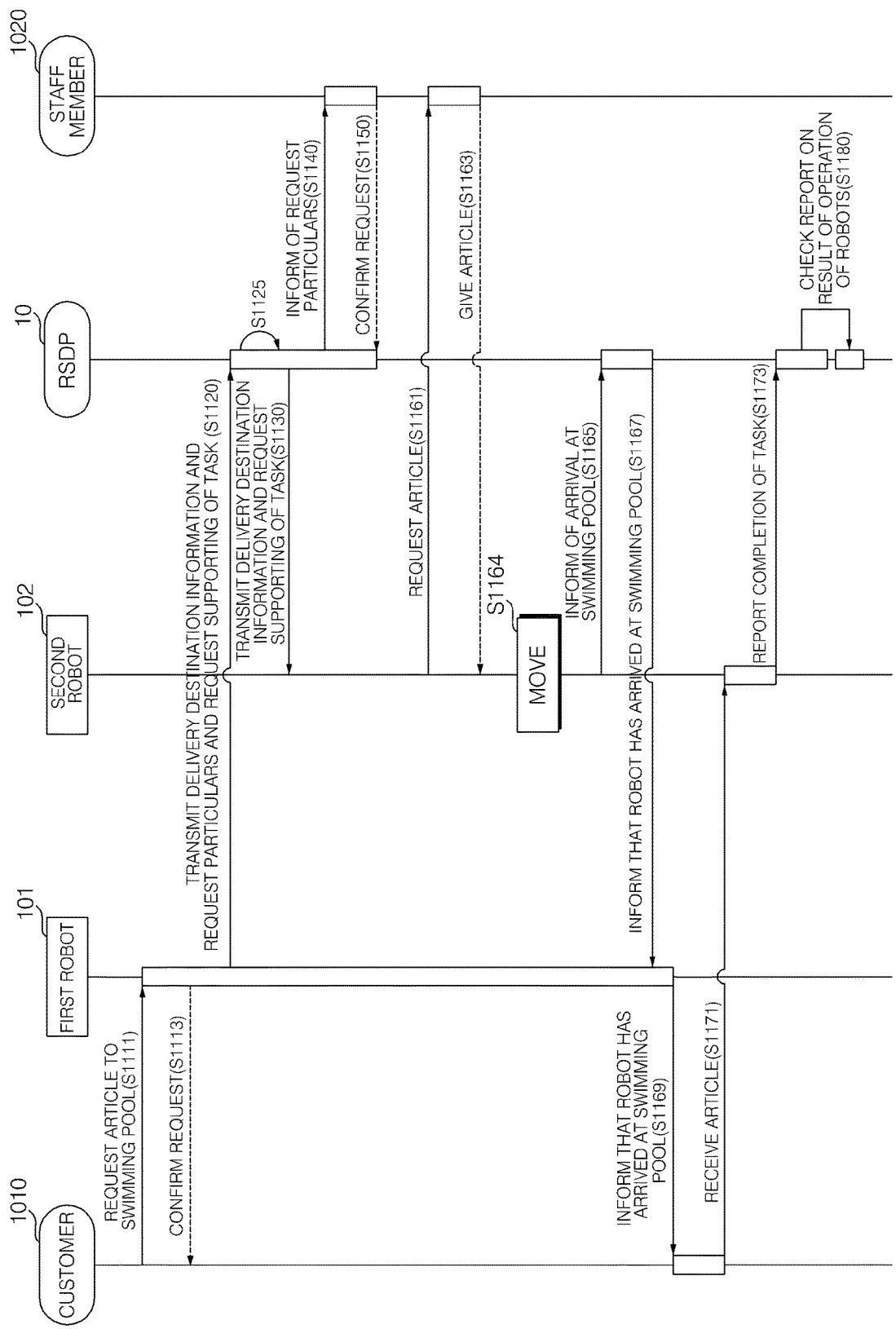
FIG. 11 is a flowchart showing the case in which an article is delivered to a designated place according to an embodiment of the present invention.

FIG. 11 is a flowchart showing the case in which an article is delivered to a designated place according to an embodiment of the present invention.

Referring to FIG. 11, a customer 1010 who lodges in a hotel room can request a predetermined article to be delivered to a specific place in 1111 step, and the first robot 101 can transmit customer request particulars to the server 10 and can request supporting of the delivery task of the article requested by the customer from the server 10 in 1120 step.

For example, in the guest room, the customer 1010 can conveniently request an article, such as a towel or a drink, to be delivered to a hotel swimming pool.

At this time, the first robot 101 can transmit information about the delivery destination, i.e. the swimming pool, the title of the article requested by the customer, and the quantity of the article to the server 10.

According to settings, the first robot 101 can confirm the article request from the customer 1010 in 1113 step.

The server 10 can identify a supporting robot that supports the delivery service task requested by the first robot 101 according to determined criteria in 1125 step.

In the case in which the second robot 102 is selected as the supporting robot, the server 10 can transmit the information about the delivery destination and the customer request particulars to the second robot 102, and can request supporting of the delivery task in 1130 step. If necessary, the server 10 can also transmit information about an article reception place to the second robot 102.

More preferably, the server 10 also transmits the customer request particulars to a staff member 1020 who manages the article to be delivered in 1140 step. For example, the server 10 can transmit the customer request particulars and a message informing that the second robot 102 should deliver the article to an electronic device of the staff member 1020.

The staff member 1020 can manipulate their own electronic device in order to confirm and input the request particulars of the server 10 in 1150 step, and, when the second robot 102 that is on standby at the article reception place or has arrived at the article reception place requests the article in 1161 step, can give the article to the second robot 102 in 1163 step.

Subsequently, the second robot 102 can move to the delivery destination, i.e. the swimming pool, while carrying the article requested by the customer 1010 in 1164 step.

When the movement of the second robot 102 to the delivery destination, i.e. the swimming pool, is completed, the second robot 102 can transmit a signal informing of the arrival at the swimming pool to the server 10 in 1165 step, and the server 10 can transmit a signal informing that the second robot 102 has arrived at the swimming pool to the first robot 101 in 1167 step.

The first robot 101 can output a message informing that the second robot 102 has arrived at the delivery destination in order to inform the customer 1010 that the second robot 102 has arrived at the swimming pool in 1169 step. The customer 1010 can receive the requested article in 1171 step.

In some embodiments, the second robot 101 can output a message informing of arrival at the delivery destination through the output unit 180.

Upon confirming the reception of the article in 1171 step, the second robot 102 can report the completion of the task to the server 10 in 1173 step.

The server 10 can check the report on the result of operation of the first robot 101 and the second robot 102, and can store and administrate data in 1180 step.

Figure 12:
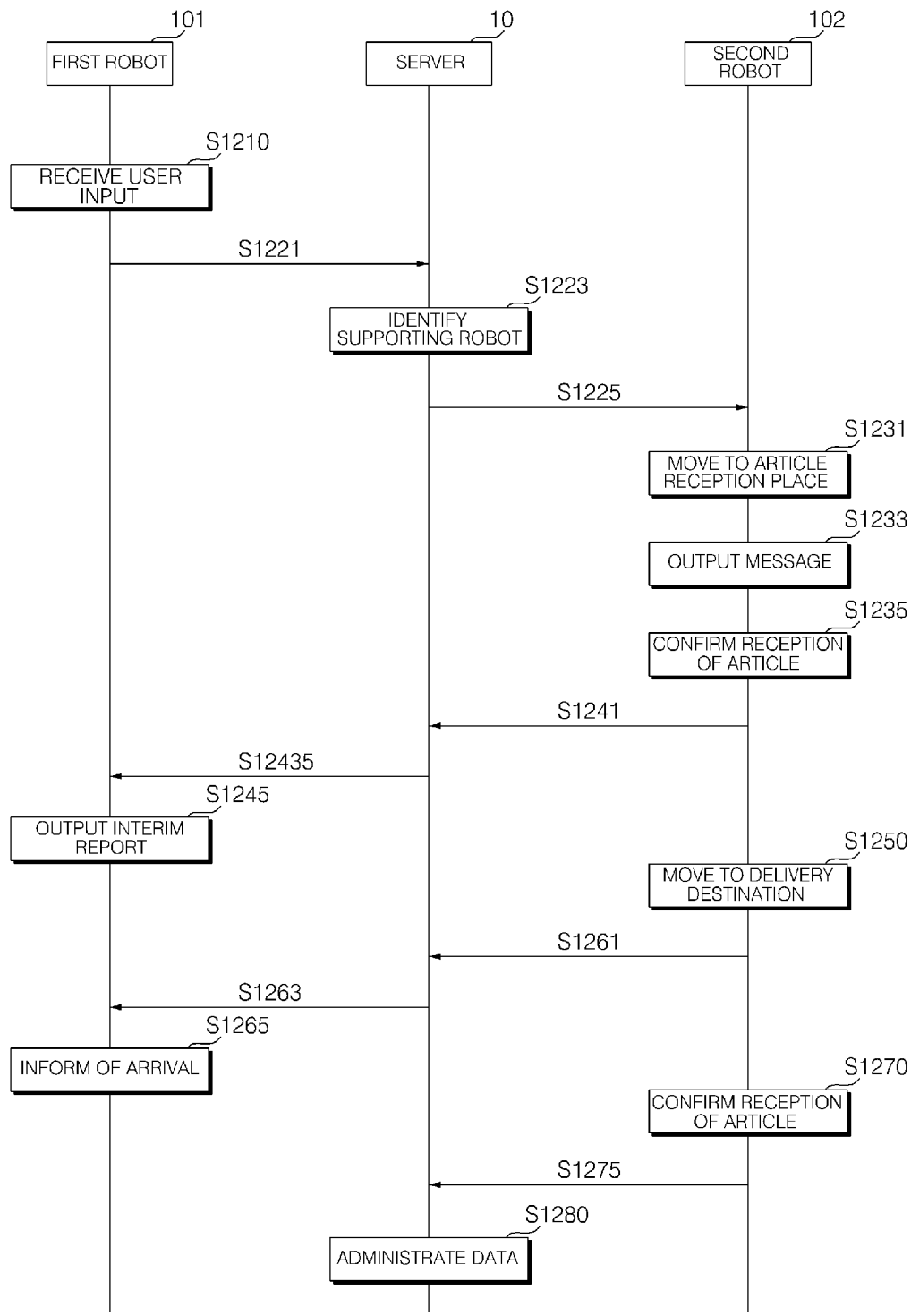
FIG. 12 is a flowchart showing a method of controlling a robot system according to an embodiment of the present invention.

FIG. 12 is a flowchart showing a method of controlling a robot system according to an embodiment of the present invention.

Referring to FIG. 12, in 1210 step, the first robot 101 can receive user input including a request for a predetermined service. For example, the first robot 101 can receive user input, such as user touch input or speech input, requesting a delivery service of a predetermined article.

The first robot 101 can transmit information based on the user input to the server 10 in 1221 step. For example, in the case in which a user requests a delivery service of delivering a predetermined article to a predetermined guest room or a predetermined table, the first robot 101 can transmit delivery service request information, such as information about the article to be delivered and information about a delivery destination, to the server 10.

Meanwhile, the server 10 can identify a supporting robot capable of supporting a task corresponding to the delivery service request in 1223 step.

The server 10 can select the supporting robot from among a plurality of robots included in the robot system based on at least one of whether the robots are performing tasks, the distances between the robots and the first robot 101, or times at which the robots are expected to finish the current tasks.

The server 10 can identify the second robot 102 as the supporting robot based on the above criteria. The first robot 101 and the second robot 102 can be the same kind of robots. More preferably, the first robot 101 and the second robot 102 are different kinds of robots. For example, the first robot 101 can be the guide robot 100a or the home robot 100b, which outputs predetermined information in the form of an image and speech in order to interact with a user, and the second robot 102 can be one of the delivery robots 100c1, 100c2, and 100c3, such as the serving robot 100c2, which is capable of delivering a predetermined article.

Meanwhile, in 1225 step, the server 10 can request a task of article delivery or escort from the second robot 102 identified as the supporting robot.

At this time, a signal that the server 10 transmits while requesting task support from the second robot 102 can include information about the task to be supported. For example, a signal transmitted to the second robot 102 can include information about an article reception place, a delivery destination, user request particulars, and a surrounding environment.

Meanwhile, in 1235 step, the second robot 102 can receive the article, and can move to the delivery destination included in the delivery request in 1250 step.

If necessary, the second robot 102 can move to the article reception place in order to receive the article in 1231 step.

Meanwhile, upon arriving at the article reception place, the second robot 102 can output a message informing of the delivery request particulars in the form of an image and/or sound in 1233 step.

For example, the second robot 102 can move a warehouse storing towels in order to receive a towel and to deliver the towel to the customer. At this time, the server 10 can also transmit the service request of the user who wants the towel to a staff member 1020 of the warehouse.

Meanwhile, after arriving at the warehouse, the second robot 102 can output information about the delivery destination and the article, such as "two towels are needed for room X" in the form of an image and/or speech.

The staff member 1020 can push an opening hard key or a confirmation (or open) button on an interface screen displayed by the second robot 102 or can perform a speech input operation in order to open a door that is capable of opening and closing a space in the second robot 102 for receiving the article.

The staff member 1020 can put two towels into the space in the second robot 102 for receiving the article, and can then close the door. Even in this case, the staff member can push a closing hard key or a confirmation (or close) button on the interface screen displayed by the second robot 102 or can perform a speech input operation in order to close the door. As a result, the reception of the article can be confirmed in 1235 step.

Upon confirming the reception of the article in 1235 step, the second robot 102 can transmit an interim report including notification of the reception of the article and movement to the delivery destination to the server 10 in 1241 step.

The server 10 can transmit the interim report to the first robot 101 in 1243 step, and the first robot 101 can output a message corresponding to the interim report through the output unit 180 in 1245 step. For example, the message corresponding to the interim report can include information about the task process, such as the reception of the article and the movement, and expected arrival time information. The expected arrival time information can be calculated by the second robot 101 or the server 10.

In some embodiments, the interim report can be provided at another step.

For example, the interim report can be provided to the first robot 101 at the step of receiving the user input in 1210 step, at the step of the second robot 102 moving to the article reception place in 1231 step, or when the step of the second robot moving to the delivery destination in 1250 step is commenced or is being performed.

After receiving the article, the second robot 102 moves to the delivery destination in 1250 step. Upon arriving at the delivery destination, the second robot 102 can transmit a signal informing of arrival at the delivery destination to the server 10 in 1261 step.

The server 10 can transmit a signal informing that the second robot 102 has arrived at the delivery destination to the first robot 101 in 1263 step, and the first robot 101 can output a message informing that the second robot 102 has arrived at the delivery destination in order to inform the customer of the arrival of the article to be served in 1265 step.

In some embodiments, the second robot 102 can output a message informing of arrival at the delivery destination through the output unit 180 in the form of an image and/or sound.

Upon confirming the reception of the article in 1270 step, the second robot 102 can report the completion of the task to the server 10 in 1275 step. The report on the task completion can include information about whether the task has been successfully performed, the details of the task, and the time taken to perform the task.

Upon receiving the report on the task completion, the server 10 can update data corresponding to the first robot 101 and the second robot 102 based on the report on the task completion, and can administrate the data in 1280 step.

Figure 13:
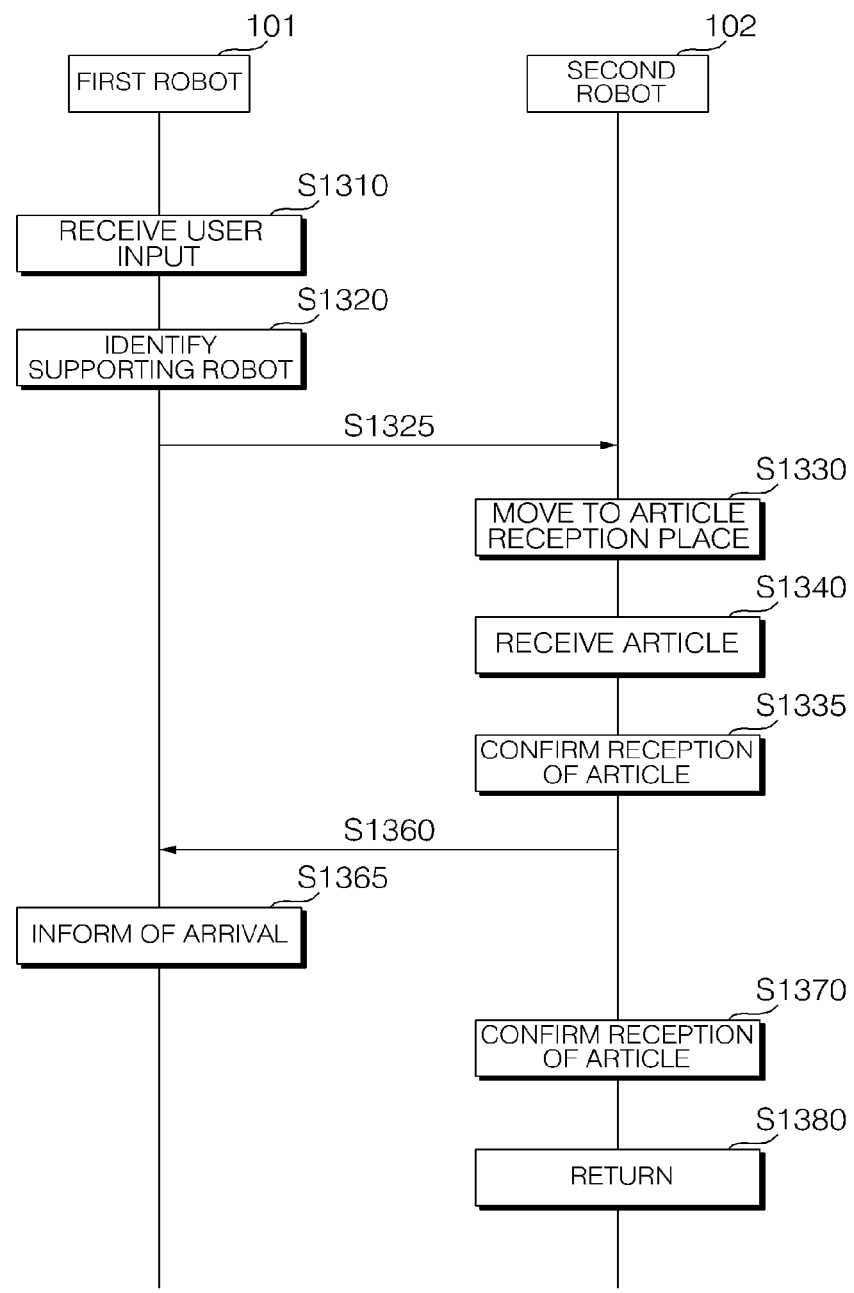
FIG. 13 is a flowchart showing a method of controlling a robot system according to an embodiment of the present invention.

FIG. 13 is a flowchart showing a method of controlling a robot system according to an embodiment of the present invention.

Referring to FIG. 13, the first robot 101 can receive user input including a request for a predetermined service in 1310 step. For example, the first robot 101 can receive user touch input or speech input in order to identify an article delivery service requested by a user. Alternatively, the first robot 101 can receive a signal including a user request for article delivery from the server 10.

In the case in which supporting of a task is necessary, the first robot 101 can directly call another kind of second robot 102 to request task support therefrom in 1325 step. For example, the first robot 101 can be the guide robot 100*a* or the home robot 100*b*, which outputs predetermined information in the form of an image and speech in order to interact with a user, and the second robot 102 can be one of the delivery robots 100*c*1, 100*c*2, and 100*c*3, such as the serving robot 100*c*2, which is capable of delivering a predetermined article. In this case, for article delivery, the guide robot 100*a* or the home robot 100*b* can request task support from the serving robot 100*c*2.

In this embodiment, the first robot 101 can directly call another robot to request task support therefrom based on the user request service in 1325 step.

In addition, the first robot 101 can directly check the current state information of robots, and can identify a supporting robot capable of supporting the task in 1320 step. For example, the first robot 101 can select the supporting robot from among the robots based on at least one of whether the robots are performing tasks, the distances between the robots and the first robot 101, or times at which the robots are expected to finish the current tasks.

To this end, the first robot 101 can receive state information of the robots from the control server 11.

Alternatively, the first robot 101 can transmit a signal requesting the task support to other robots, and can select the supporting robot from among the robots that have transmitted a response signal.

In this case, the signal transmitted by the first robot 101 can include information about user request particulars, such as article information and delivery destination information, and information necessary to provide a service, such as information about an article reception place. In addition, the response signal transmitted by the robots can include location information and state information of the robots.

The first robot 101 can check the information included in the response signal in order to select the supporting robot based on predetermined criteria. In this embodiment, cooperation can be achieved even in the case in which the server 10 malfunctions or communication between the server 10 and the first robot 101 is poor.

Consequently, it is possible to select a supporting robot suitable to perform a task corresponding to the service and to efficiently administrate robots.

The first robot 101 can directly identify a supporting robot capable of supporting the task corresponding to the delivery request in 1320 step, and the first robot 101 can transmit information based on the user input to the second robot 102 while requesting task support therefrom in 1325210 step.

Here, the information based on the user input can include information about the location of the first robot 101 or the place at which the service is provided and user request particulars. For example, in the case in which a user requests a delivery service of delivering a predetermined article to a predetermined guest room or a predetermined table, the first robot 101 can transmit information about the current location of the first robot 101, delivery destination information, and delivery service request information to the second robot 102.

Meanwhile, the second robot 102 can receive the article in 1340 step, and can move to the delivery destination included in the delivery request in 1350 step.

Here, the delivery destination can be the place at which the first robot 101 is located or a specific place included in the user input.

In the case in which the delivery destination is not specified, the place at which the first robot 101 is located can be set as the delivery destination by default. Also, in the case in which the user inputs a specific place through touch input or speech input, the input place can be set as the delivery destination.

In the case in which the place designated as the delivery destination is included in the delivery request, the second robot 102 can move to the designated place. In the case in which the place designated as the delivery destination is not included in the delivery request, the second robot 102 can move to the place at which the first robot 101 is located.

Alternatively, the server 10 can automatically set the delivery destination using the customer information, the guest room information, etc.

In some embodiments, the second robot 102 can move to the article reception place in order to receive the article in 1330 step.

Meanwhile, upon arriving at the article reception place, the second robot 102 can output a message informing of the delivery request particulars in the form of an image and/or sound.

For example, the second robot 102 can display the article included in the delivery request particulars, i.e. the article to be delivered, and the quantity thereof on the display 182. In addition, the second robot 102 can output a message informing of the article to be delivered and the quantity thereof through the sound input unit 181 in the form of speech.

Upon confirming the reception of the article in 1340 step, the second robot 102 can move to the delivery destination in 1350 step.

The confirmation of the reception of the article can be automatically performed using the weight sensor or the camera provided at the second robot 102.

Alternatively, in the case in which touch input, speech input, or another predetermined manipulation is performed by a staff member, the second robot 102 can determine that the article has been received.

Meanwhile, upon arriving at the delivery destination, the second robot 102 can transmit a signal informing of arrival at the delivery destination to the first robot 101 in 1360 step.

Consequently, the first robot 101 can output a message informing that the second robot 102 has arrived at the delivery destination in order to inform the customer of the arrival of the article to be served in 1365 step. In the case in which the delivery of a convenience article to a guest room is requested, the customer can open a door of the guest room in order to receive the article to be served.

In some embodiments, the second robot 102 can output a message informing of arrival at the delivery destination through the output unit 180 in the form of an image and/or sound.

Upon confirming the reception of the article in 1370 step, the second robot 102 can autonomously travel according to the settings in order to return to a designated place in 1380 step.

In some embodiments, the confirmation of the reception of the article can be automatically performed using the recognition means provided at the second robot 102, such as the weight sensor or the camera.

Alternatively, in the case in which touch input, speech input, or another predetermined manipulation is performed by the customer, the second robot 102 can determine that the article has been received.

Upon confirming the reception of the article in 13700 step, the second robot 102 can report the completion of the task to the first robot 101. The report on the task completion can include information about whether the task has been successfully performed, the details of the task, and the time taken to perform the task.

In addition, the first robot 101 can report the completion of the task to the server 10.

Upon receiving the report on the task completion, the server 10 can update data corresponding to the first robot 101 and the second robot 102 based on the report on the task completion, and can administrate the data. Consequently, data related to the robots can be effectively administrated, and the server 10 can analyze and learn the data related to the robots.

Figure 14:
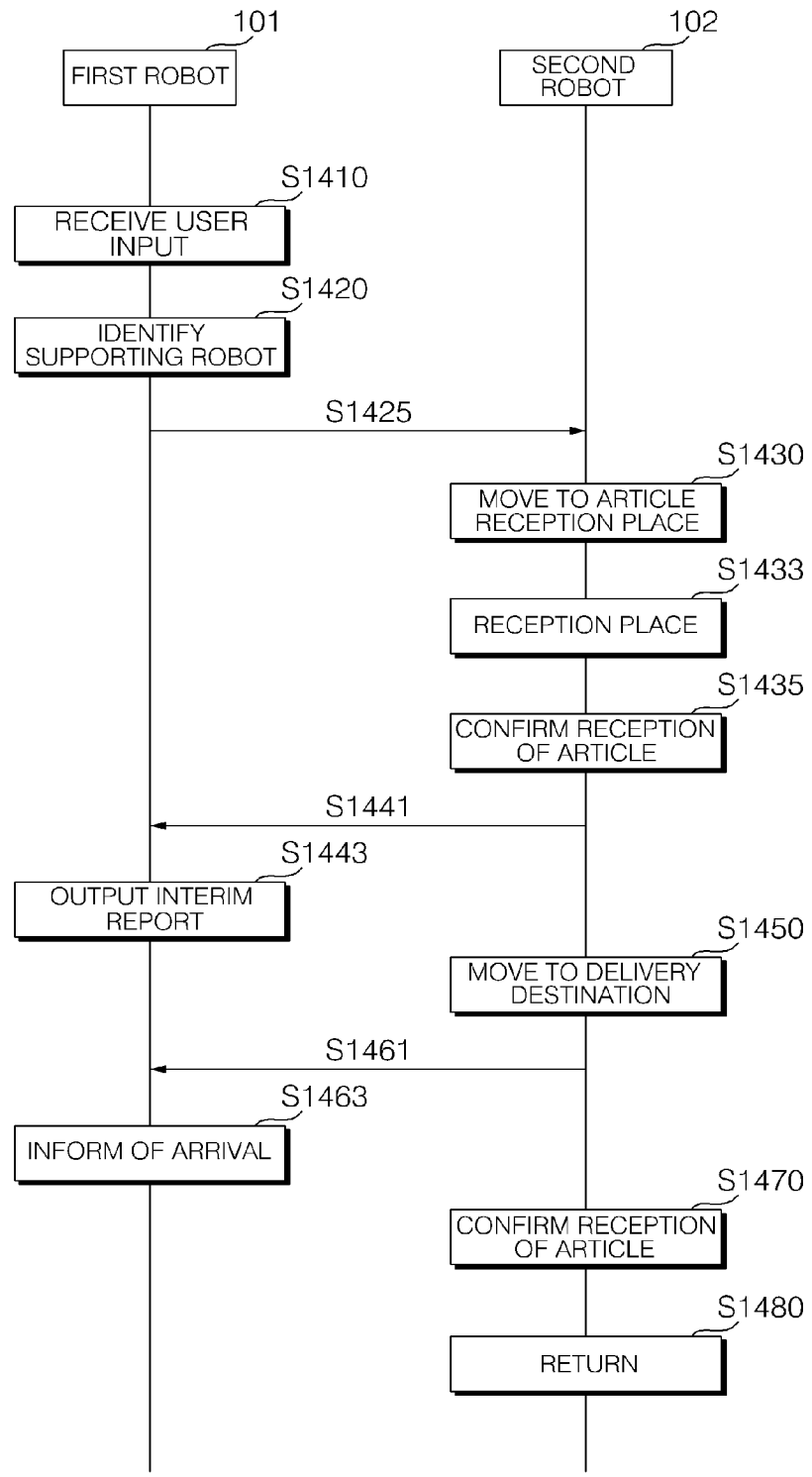
FIG. 14 is a flowchart showing a method of controlling a robot system according to an embodiment of the present invention.

FIG. 14 is a flowchart showing a method of controlling a robot system according to an embodiment of the present invention.

Referring to FIG. 14, the first robot 101 can receive user input including a request for a delivery service in 1410 step, and the first robot 101 can identify a supporting robot capable of supporting the delivery service task in 1420 step. For example, the first robot 101 can select the supporting robot from among a plurality of robots based on at least one of whether the robots are performing tasks, the distances between the robots and the first robot 101, or times at which the robots are expected to finish the current tasks.

The first robot 101 can transmit information based on the user input to the second robot 102 while requesting task support therefrom in 1425 step. Here, the information based on the user input can include information necessary to provide a service, such as information about an article to be delivered, delivery destination information, and delivery service request information.

Meanwhile, the second robot 102 can receive the article in 1435 step, and can move to the delivery destination included in the delivery request in 1450 step.

If necessary, the second robot 102 can move to the article reception place in order to receive the article in 1431 step.

Meanwhile, upon arriving at the article reception place, the second robot 102 can output a message informing of the delivery request particulars in the form of an image and/or sound in 1433 step.

Upon confirming the reception of the article in 1435 step, the second robot 102 can transmit an interim report including notification of the reception of the article and movement to the delivery destination to the first robot 101 in 1441 step.

The first robot 101 can output a message corresponding to the interim report through the output unit 180 in 1443 step. For example, the message corresponding to the interim report can include information about the task process, such as the reception of the article and movement, and expected arrival time information. The expected arrival time information can be calculated by the second robot 101.

In some embodiments, the interim report can be provided at another step.

For example, the interim report can be provided to the first robot 101 at the step of receiving the user input in 1410 step, at the step of the second robot 102 moving to the article reception place in 1431 step, or when the step of the second robot moving to the delivery destination in 1450 step is commenced or is being performed.

Meanwhile, the second robot 102 can receive the article in 1435 step, and can move to the delivery destination included in the delivery request in 1450 step.

Meanwhile, upon arriving at the delivery destination, the second robot 102 can transmit a signal informing of arrival at the delivery destination to the first robot 101 in 1461 step.

Consequently, the first robot 101 can output a message informing that the second robot 102 has arrived at the delivery destination in order to inform the customer of the arrival of the article to be served in 1463 step.

In some embodiments, the second robot 102 can output a message informing of arrival at the delivery destination through the output unit 180 in the form of an image and/or sound.

Upon confirming the reception of the article in 1470 step, the second robot 102 can return to a designated place according to the settings in 1480 step.

Even in this case, upon confirming the reception of the article in 1470 step, the second robot 102 can report the completion of the task to the first robot 101. In addition, the first robot 101 can report the completion of the task to the server 10.

Upon receiving the report on the task completion, the server 10 can update data corresponding to the first robot 101 and the second robot 102 based on the report on the task completion, and can administrate the data. Consequently, data related to the robots can be effectively administrated, and the server 10 can analyze and learn the data related to the robots.

FIGS. 15 to 18 are reference views illustrating the operation of the robot system according to the embodiment of the present invention.

Figure 15:
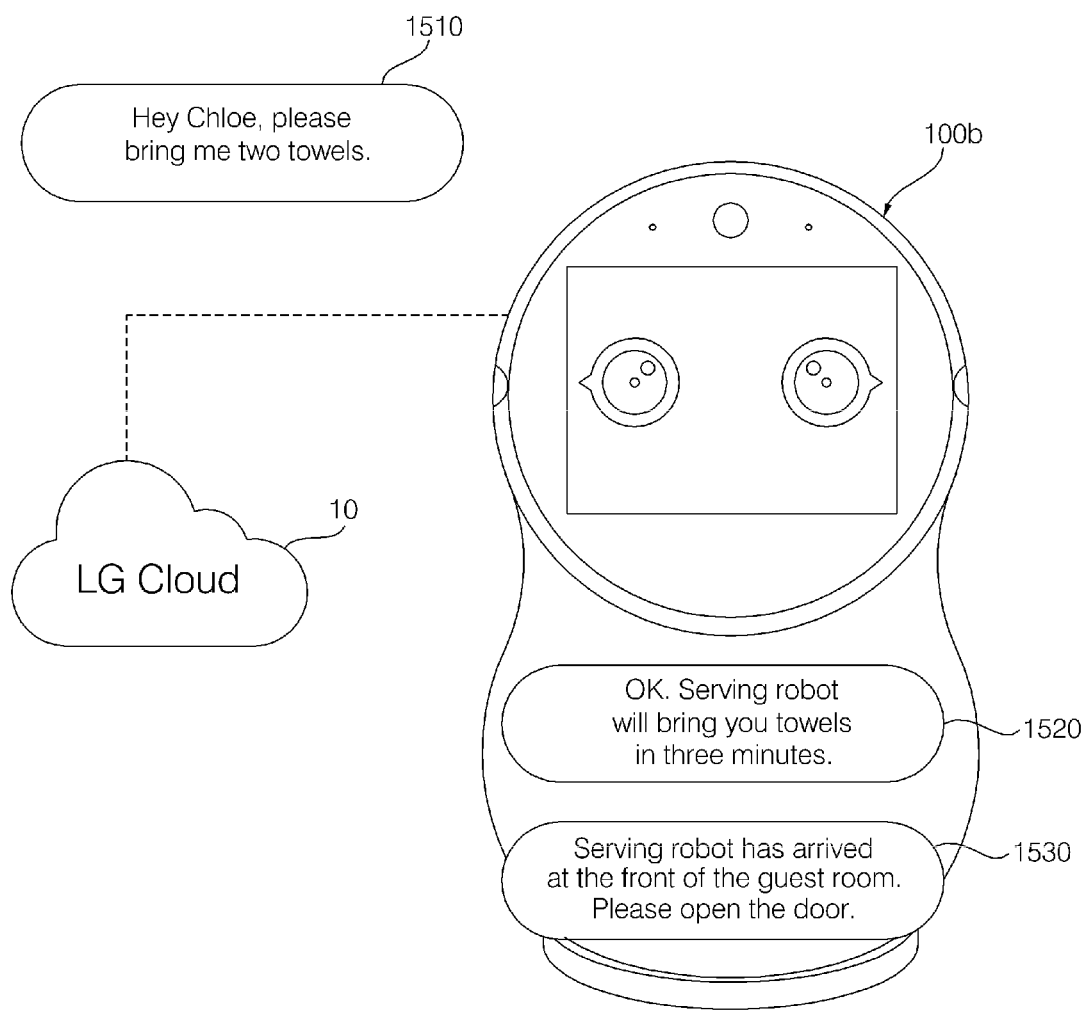
FIGS. 15 to 18 are reference views illustrating the operation of the robot system according to the embodiment of the present invention.

Referring to FIG. 15, the home robot 100b, which is disposed at a specific place, such as a guest room, can receive user input including a customer service request.

The home robot 100b can be connected to the server 10 in order to report the operation state and the user request thereto, and can be operated under the control of the server 10.

For example, the home robot 100b can receive user input 1510 for requesting the delivery of a specific article, such as "Hey Chloe, please bring me two towels."

The home robot 100b can transmit information corresponding to the user input 1510 to the server, and the server 10 can identify a serving robot 100c2 capable of supporting a delivery task.

In addition, the server 10 can transmit estimated time information to the home robot 100b, and the home robot 100b can output a message 1520 related to a service.

In some embodiments, the customer can request a room service or a delivery service using a telephone disposed at a specific place (for example, a guest room telephone), a tablet PC, or a TV.

Alternatively, the home robot 100b can transmit customer request particulars to a reception desk, and a staff member can select the serving robot 100c2 capable of supporting the delivery task, and can input the same to the server 10.

Figure 16:
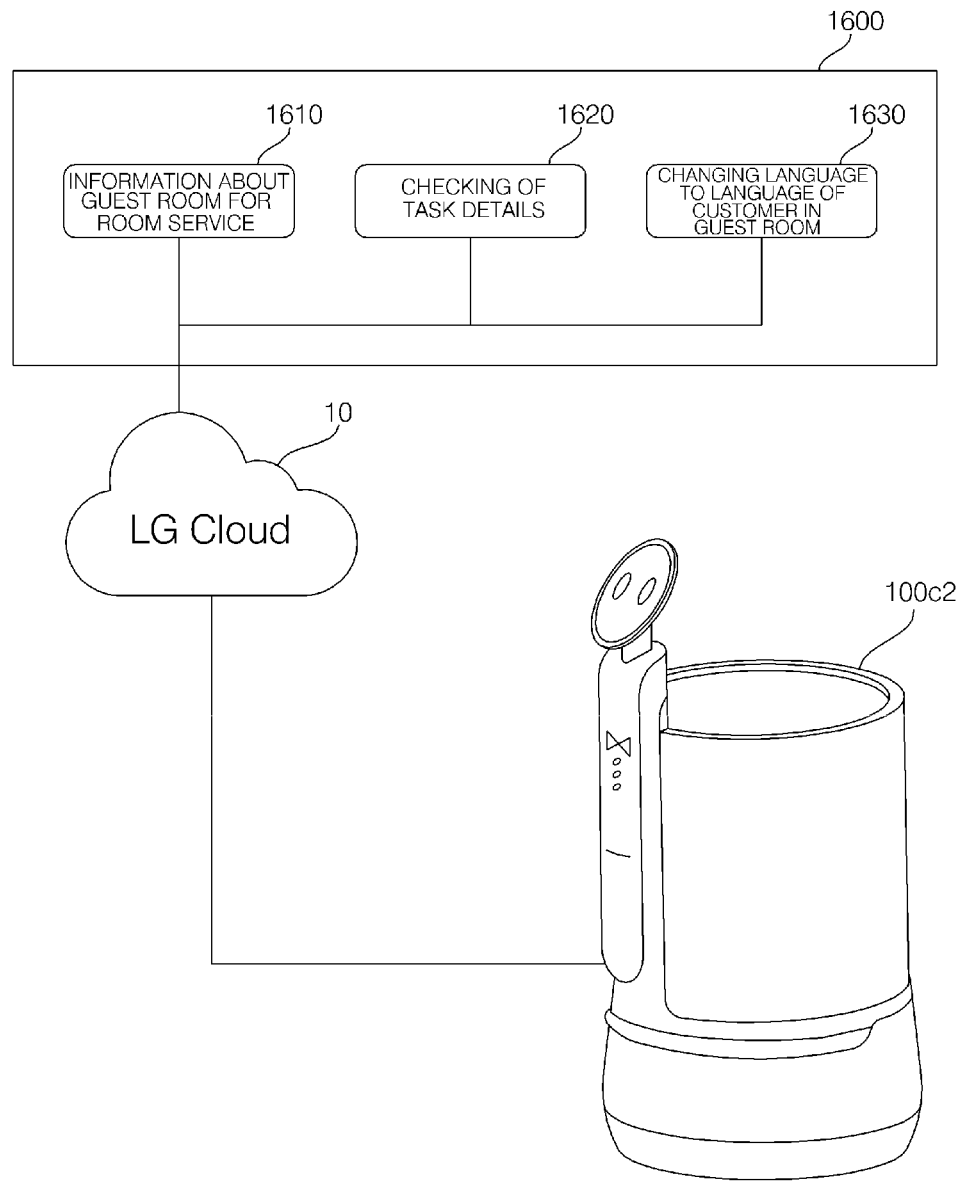

Referring to FIG. 16, in the case in which the serving robot 100c2 is used at a hotel or a resort, an administrator can input settings 1600 related to functions that the serving robot 100c2 is capable of providing at the hotel or the resort to the server 10. For example, the administrator can set information about a guest room for room service 1610, checking of task details 1620, and a language corresponding to a language of a customer in a guest room 1630.

The serving robot 100c2 can download the settings input by the administrator, content, and information from the server 10. The serving robot 100c2 can check information about the position of the guest room and data on the customer in the guest room, and can download data corresponding to a language of the customer from the server 10. For example, in the case in which the customer speaks Arabic, the serving robot 100c2 can download relevant data in order to provide an audible message in Arabic.

Figure 17:
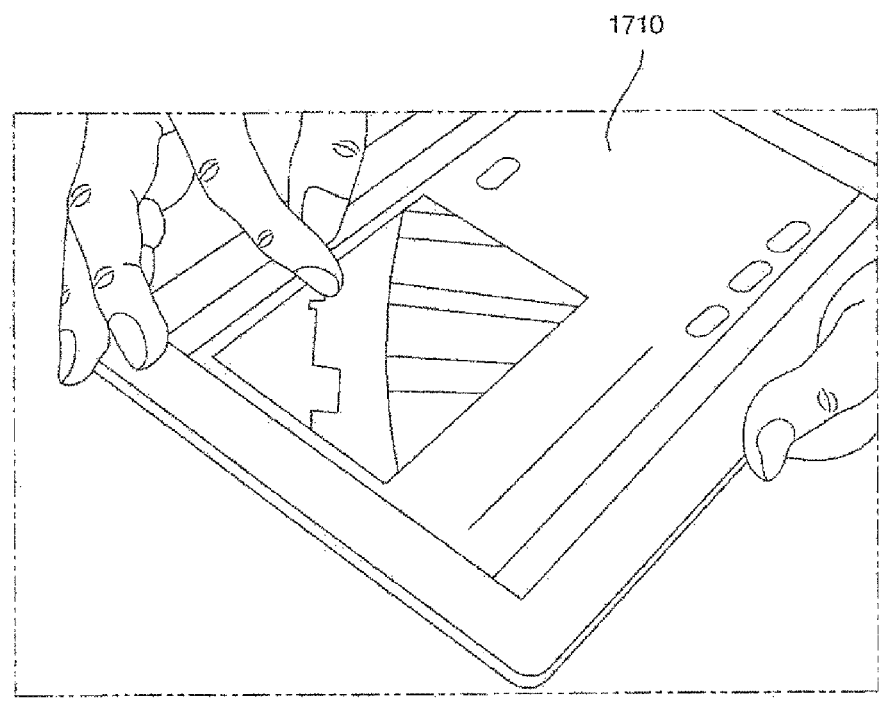

Referring to FIG. 17, the administrator can monitor the operation of the serving robot 100c2 through their electronic device 1710.

Meanwhile, the administrator can check state information of the serving robot 100c2 through their electronic device 1710, and can instruct the serving robot 100c2 that has returned to a designated place and is on standby or to the serving robot 100c2 that is returning to perform a new task.

The serving robot 100c2 can autonomously travel to a delivery destination, i.e. a guest room. When the serving robot 100c2 arrives at the front of the guest room, the home robot 100b, which has received the arrival information, can inform the customer that the serving robot 100c2 has arrived.

Figure 18:
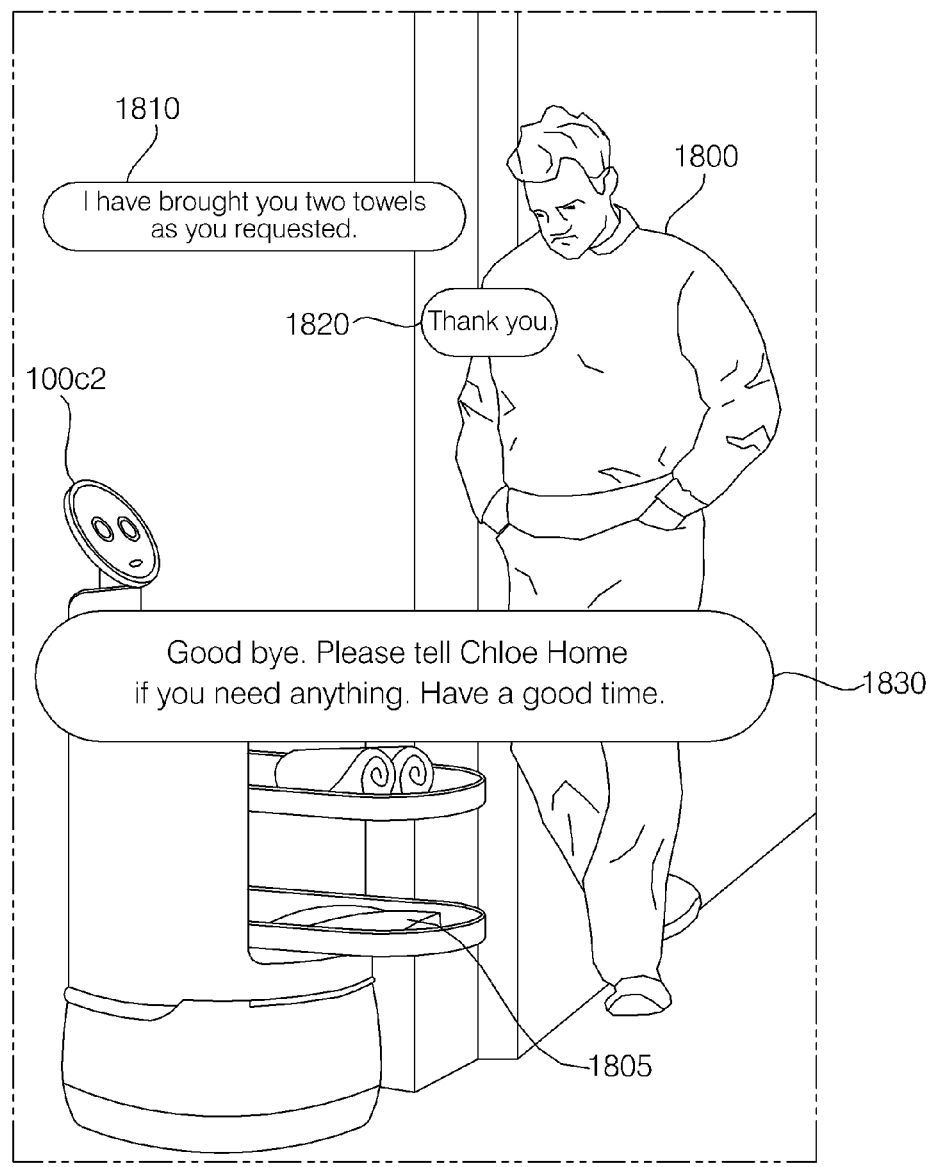

Referring to FIG. 18, the customer 1800, who has been informed of arrival to the guest room from the home robot 100b, can open a door, and can receive a requested article 1805.

The serving robot 100c2 can sense the customer 1800 based on an image acquired by the image acquisition unit 120, and can interact with the customer 1800.

For example, the serving robot 100c2 can provide a speech message 1810 related to the delivery service to the customer, and can recognize customer speech 1820.

In addition, when the customer 1800 takes the delivered article 1805, the serving robot 100c2 can say goodbye, and can return to a designated place, such as a reception desk.

The robot system according to the present invention and the method of controlling the same are not limitedly applied to the constructions and methods of the embodiments as previously described; rather, all or some of the embodiments can be selectively combined to achieve various modifications.

Meanwhile, the method of controlling the robot system according to the embodiment of the present invention can be implemented as code that can be written on a processor-readable recording medium and thus read by a processor. The processor-readable recording medium can be any type of recording device in which data is stored in a processor-readable manner. The processor-readable recording medium can include, for example, read only memory (ROM), random access memory (RAM), compact disc read only memory (CD-ROM), magnetic tape, a floppy disk, and an optical data storage device, and can be implemented in the form of a carrier wave transmitted over the Internet. In addition, the processor-readable recording medium can be distributed over a plurality of computer systems connected to a network such that processor-readable code is written thereto and executed therefrom in a decentralized manner.

It will be apparent that, although the preferred embodiments have been shown and described above, the present invention is not limited to the above-described specific embodiments, and various modifications and variations can be made by those skilled in the art without departing from the gist of the appended claims. Thus, it is intended that the modifications and variations should not be understood independently of the technical spirit or prospect of the present invention.

The invention claimed is:

1. A method of controlling a robot system, the method comprising:

receiving a user input by a user, the user input comprising a request for delivery of a predetermined article, by a first robot;
transmitting information based on the user input to a server, by the first robot;
identifying a second robot for supporting a task corresponding to the request for delivery, by the server;
requesting the task from the second robot, by the server;
upon the second robot arriving at a delivery destination, informing of arrival at the delivery destination to the server, by the second robot;
informing that the second robot has arrived at the delivery destination to the first robot, by the server;
outputting a message informing that the second robot has arrived at the delivery destination, by the first robot;
receiving, by the second robot, the article; and
moving the second robot to the delivery destination included in the request for delivery.

2. The method according to claim 1, wherein the delivery destination is where the first robot is located or is a specific place included in the user input.

3. The method according to claim 1, wherein the step of the second robot moving to the delivery destination comprises:
when a place designated as the delivery destination is included in the request for delivery, moving the second robot to the designated place; and
when the place designated as the delivery destination is not included in the request for delivery, moving the second robot moving to a place where the first robot is located.

4. The method according to claim 1, further comprising:
prior to the second robot receiving the article, moving the second robot to an article reception place.

5. The method according to claim 4, further comprising:
outputting another message informing of delivery request particulars upon the second robot arriving at the article reception place, by the second robot.

6. The method according to claim 1, further comprising:
upon the second robot confirming receiving the article, transmitting an interim report comprising notification of receiving the article and movement of the second robot to the delivery destination, to the server, by the second robot;
transmitting the interim report to the first robot, by the server; and
outputting another message corresponding to the interim report, by the first robot.

7. The method according to claim 1, wherein the step of identifying the second robot comprises selecting the second robot from among a plurality of second robots based on at least one of whether the second robots are performing tasks, distances between the second robots and the first robot, and times at which the second robots are expected to finish current tasks, by the server.

8. The method according to claim 1, further comprising:
upon the second robot confirming receiving the article, reporting completion of the task to the server, by the second robot; and
updating data corresponding to the first robot and the second robot based on the second robot reporting completion of the task, by the server.

9. The method according to claim 1, further comprising:
outputting predetermined information as an image and speech to the user, by the first robot; and
delivering the article, by the second robot.

10. A method of controlling a robot system, the method comprising:
- receiving a user input by a user, the user input comprising a request for delivery of a predetermined article, by a first robot;
- identifying a second robot for supporting a task corresponding to the request for delivery, by the first robot;
- requesting the task from the second robot, by the first robot;
- receiving the article, by the second robot;
- moving to a delivery destination included in the request for delivery, by the second robot;
- upon the second robot arriving at the delivery destination, transmitting a signal informing of arrival at the delivery destination to the first robot, by the second robot; and
- outputting a message informing that the second robot has arrived at the delivery destination, by the first robot.

11. The method according to claim 10, wherein the delivery destination is where the first robot is located or is a specific place included in the user input.

12. The method according to claim 10, wherein the step of the second robot moving to the delivery destination comprises:
- when a place designated as the delivery destination is included in the request for delivery, moving the second robot to the designated place; and
- when the place designated as the delivery destination is not included in the request for delivery, moving the second robot to a place where the first robot is located.

13. The method according to claim 10, further comprising:
- prior to the second robot receiving the article, moving the second robot to an article reception place.

14. The method according to claim 13, further comprising:
- outputting another message informing of delivery request particulars upon arriving at the article reception place, by the second robot.

15. The method according to claim 10, further comprising:
- upon the second robot confirming receiving the article, transmitting an interim report comprising notification of receiving the article and movement of the second robot to the delivery destination, to the first robot, by the second robot; and
- outputting another message corresponding to the interim report, by the first robot.

16. The method according to claim 10, wherein the step of identifying the second robot comprises selecting the second robot from among a plurality of second robots based on at least one of whether the second robots are performing tasks, distances between the second robots and the first robot, and times at which the second robots are expected to finish current tasks, by the first robot.

17. The method according to claim 10, further comprising:
- upon the second robot confirming receiving the article, reporting completion of the task to a server, by the second robot; and
- updating data corresponding to the first robot and the second robot based on the reporting completion of the task, by the server.

18. The method according to claim 10, further comprising:
- outputting predetermined information as an image and speech to the user, by the first robot; and
- delivering the article, by the second robot.

* * * * *